US009152243B2

(12) United States Patent
Gu

(10) Patent No.: US 9,152,243 B2
(45) Date of Patent: Oct. 6, 2015

(54) OBJECT TRACKING USING BACKGROUND AND FOREGROUND MODELS

(71) Applicant: QUALCOMM Incorporated, San Diego, CA (US)

(72) Inventor: Jin Gu, Nepean (CA)

(73) Assignee: Qualcomm Incorporated, San Diego, CA (US)

(*) Notice: Subject to any disclaimer, the term of this patent is extended or adjusted under 35 U.S.C. 154(b) by 185 days.

(21) Appl. No.: 13/777,897

(22) Filed: Feb. 26, 2013

(65) Prior Publication Data

US 2014/0056471 A1 Feb. 27, 2014

Related U.S. Application Data

(60) Provisional application No. 61/692,600, filed on Aug. 23, 2012.

(51) Int. Cl.
G06K 9/00 (2006.01)
G06F 3/03 (2006.01)
G06K 9/34 (2006.01)
G06K 9/62 (2006.01)
G06F 3/01 (2006.01)
(Continued)

(52) U.S. Cl.
CPC .............. *G06F 3/0304* (2013.01); *G06F 3/017* (2013.01); *G06K 9/00208* (2013.01); *G06K 9/00355* (2013.01); *G06K 9/34* (2013.01); *G06K 9/6242* (2013.01); *G06T 7/208* (2013.01); *G06T 7/004* (2013.01); *G06T 7/2046* (2013.01); *G06T 2207/10016* (2013.01); *G06T 2207/10021* (2013.01); *G06T 2207/20144* (2013.01); *G06T 2207/30196* (2013.01)

(58) Field of Classification Search
None
See application file for complete search history.

(56) References Cited

U.S. PATENT DOCUMENTS 6,661,918 B1 * 12/2003 Gordon et al. ................ 382/173
6,954,498 B1 * 10/2005 Lipton ..................... 375/240.08
2003/0113018 A1 6/2003 Nefian et al.

(Continued)

FOREIGN PATENT DOCUMENTS

EP 1950688 A1 7/2008
GB 2467804 A 8/2010

(Continued)

OTHER PUBLICATIONS

Harville M Ert AL: "Foreground segmentation using adaptive mixture models in color and depth," Proceedings IEEE Workshop on Detection and Recognition of events in Video, IEEE, US, Jul. 8, 2001 (Jul. 8, 2001), pp. 3-11, XP008060089.

(Continued)

*Primary Examiner* — Shervin Nakhjavan
(74) *Attorney, Agent, or Firm* — Kilpatrick Townsend & Stockton LLP

(57) ABSTRACT

Various arrangements for modeling a scene are presented. A plurality of images of the scene captured over a period of time may be received, each image comprising a plurality of pixels. A plurality of background models may be created using the plurality of images. At least one background model may be created for each pixel of the plurality of pixels. A plurality of foreground models may be created using the plurality of images. A foreground model may be created for each pixel of at least a first subset of pixels of the plurality of pixels. The background models and the foreground models may be indicative of the scene over the period of time.

29 Claims, 22 Drawing Sheets

(51) Int. Cl.
*G06T 7/20* (2006.01)
*G06T 7/00* (2006.01)

(56) References Cited

U.S. PATENT DOCUMENTS

| | | |
|---|---|---|
| 2004/0190776 A1 | 9/2004 | Higaki et al. |
| 2005/0259870 A1* | 11/2005 | Kondo et al. ............... 382/173 |
| 2005/0271279 A1 | 12/2005 | Fujimura et al. |
| 2007/0273765 A1* | 11/2007 | Wang et al. ............... 348/152 |
| 2007/0280540 A1 | 12/2007 | Ikeda |
| 2008/0130948 A1 | 6/2008 | Ozer |
| 2008/0304735 A1* | 12/2008 | Yang et al. ............... 382/164 |
| 2009/0077504 A1 | 3/2009 | Bell et al. |
| 2009/0102788 A1 | 4/2009 | Nishida et al. |
| 2009/0153730 A1* | 6/2009 | Knee et al. ............... 348/445 |
| 2009/0244309 A1 | 10/2009 | Maison et al. |
| 2010/0188519 A1 | 7/2010 | Yamaoka et al. |
| 2010/0329511 A1 | 12/2010 | Yoon et al. |
| 2011/0210915 A1 | 9/2011 | Shotton et al. |
| 2011/0211754 A1 | 9/2011 | Litvak et al. |
| 2011/0242277 A1* | 10/2011 | Do et al. ............... 348/43 |
| 2011/0262002 A1 | 10/2011 | Lee |
| 2011/0295469 A1 | 12/2011 | Rafii et al. |
| 2011/0317871 A1 | 12/2011 | Tossell et al. |
| 2012/0019625 A1* | 1/2012 | Mishima et al. ............... 348/49 |
| 2012/0051631 A1 | 3/2012 | Nguyen et al. |
| 2012/0062736 A1 | 3/2012 | Xiong |
| 2012/0294489 A1 | 11/2012 | Martin et al. |
| 2012/0314942 A1* | 12/2012 | Williams et al. ............... 382/164 |
| 2013/0027550 A1* | 1/2013 | Evangelio et al. ............... 348/143 |
| 2013/0094696 A1* | 4/2013 | Zhang ............... 382/103 |
| 2013/0129205 A1* | 5/2013 | Wang et al. ............... 382/164 |
| 2013/0251203 A1 | 9/2013 | Masamoto et al. |
| 2015/0003727 A1* | 1/2015 | Carpenter et al. ............... 382/164 |

FOREIGN PATENT DOCUMENTS

| | | |
|---|---|---|
| WO | WO-0034919 A1 | 6/2000 |
| WO | WO-2009035705 A1 | 3/2009 |
| WO | WO-2012077267 A1 | 6/2012 |

OTHER PUBLICATIONS

International Search Report and Written Opinion—PCT/US2013/053810—ISA/EPO—Oct. 31, 2013.

Stauffer C et al: "Learning Patterns of Activity Using Real-Time Tracking," Transactions on Pattern Analysis and Machine Intelligence, IEEE, Piscataway, USA, vol. 22, No. 8, Aug. 1, 2000 (Aug. 1, 2000), pp. 747-757, XP000976482, ISSN:0162-8828, DOI: 10.1109/34.868677 the whole document.

* cited by examiner

OBJECT TRACKING USING BACKGROUND AND FOREGROUND MODELS

CROSS-REFERENCES TO RELATED APPLICATIONS

This non-provisional application claims priority to provisional application No. 61/692,600, entitled "Object Tracking Using Background and Foreground Models", filed Aug. 23, 2012, the entire disclosure of which is hereby incorporated by reference for all purposes.

BACKGROUND

A person's movements may be used to control electronic devices. A hand movement or movement of another part of the person's body can be detected by an electronic device and used to determine a command to be executed by the device (e.g., provided to an interface being executed by the device) or to be output to an external device. Such movements by a person may be referred to as a gesture. Gestures may not require the person to physically manipulate an input device. Rather, one or more images of the person may be captured to identify the gesture being performed. As an example, when watching television, a person may use gestures to change the channel, raise and lower the volume, and/or shut off the television. A hand or some other part of a person's body may be used to perform each gesture. Similarly, an object held or controlled by the person may be used to perform the gesture.

Gestures may be useful to control devices. However, reliably detecting gestures, or, more generally, determining a position of a part of a person's body, may be difficult and/or computationally expensive.

SUMMARY

In some embodiments, a method for modeling a scene is presented. The method may include receiving a plurality of images of the scene captured over a period of time, each image comprising a plurality of pixels. The method may include creating a plurality of background models using the plurality of images. At least one background model may be created for each pixel of the plurality of pixels. The method may include creating a plurality of foreground models using the plurality of images. A foreground model may be created for each pixel of at least a first subset of pixels of the plurality of pixels. The plurality of background models and the plurality of foreground models may be indicative of the scene over the period of time.

Embodiments of such a method may include one or more of the following: The method may include determining a second subset of the plurality of pixels at least partially based on the plurality of background models and the plurality of foreground models. The second subset of the plurality of pixels may contain only some of the plurality of pixels. The method may include outputting only the second subset of the plurality of pixels. Determining the second subset of the plurality of pixels at least partially based on the plurality of background models and the plurality of foreground models may include, for a pixel having a foreground model and a background model, determining if the pixel more likely corresponds to the foreground model or the background model. Determining the second subset of the plurality of pixels at least partially based on the plurality of background models and the plurality of foreground models may include, for a pixel having a foreground model and a background model, determining: if a probability the pixel is likely to be background is greater than a first threshold value based on the background model for that pixel, and if a probability the pixel is likely to be foreground is greater than a second threshold value based on the foreground model for that pixel. The method may include performing a depth segmentation process on the second subset of the plurality of pixels. The determined second subset may be representative of at least a portion of a control object. The method may include determining an input to an application based at least in part on the second subset. Each foreground model of the plurality of foreground models may be created if a pixel corresponding to the foreground model represents a portion of a person.

Additionally or alternatively, embodiments of such a method may include one or more of the following: Each pixel of the image may include a depth value and an intensity value. Creating each background model of the plurality of background models may include determining for each pixel at least a first and second statistical measure established over a first portion of the period of time based at least in part on the intensity value and the depth value for the pixel in multiple images of the plurality of images. The method may include creating a second background model for a pixel of the plurality of pixels, wherein the second background model comprises at least a third and fourth statistical measure established for the pixel over a second portion of the period of time based at least in part on the intensity value and the depth value for the pixel in multiple images of the plurality of images. The method may include receiving an indication for each pixel of the first subset of pixels and a depth value for each pixel of the first subset of pixels, the indication being indicative that the pixel corresponds to a person. The method may include receiving a second plurality of images of the scene captured over a second period of time. The method may include updating one or more background models of the plurality of background models and foreground models of the plurality of foreground models based on the second plurality of images. The plurality of background models and the plurality of foreground models may be used by an application for determining whether a user is present. The plurality of background models and the plurality of foreground models may be used by an application for determining whether an input has occurred. The method may include determining whether an object in a current image is in a foreground of the scene based at least in part on the plurality of background models and the plurality of foreground models, wherein the application determines whether the object has provided the input in response to determining that the object is in the foreground.

In some embodiments, a system for modeling a scene is presented. The system may include an image acquisition module configured to receive a plurality of images of the scene captured over a period of time, each image comprising a plurality of pixels. The system may include a background modeling module configured to create a plurality of background models using the plurality of images, wherein at least one background model is created for each pixel of the plurality of pixels. The system may include a foreground modeling module configured to create a plurality of foreground models using the plurality of images. A foreground model may be created for each pixel of at least a first subset of pixels of the plurality of pixels. The plurality of background models and the plurality of foreground models may be indicative of the scene over the period of time.

Embodiments of such a system may include one or more of the following: The system may include an extraction module configured to determine a second subset of the plurality of pixels at least partially based on the plurality of background models and the plurality of foreground models. The second subset of the plurality of pixels may contain only some of the plurality of pixels. The system may include an output module configured to create an output of the second subset of the plurality of pixels. The extraction module may be further configured to determine, for a pixel having a foreground model and a background model, if the pixel more likely corresponds to the foreground model or the background model. The extraction module may include a submodule configured to determine, for a pixel having a foreground model and a background model: if a probability the pixel is likely to be background is greater than a first threshold value based on the background model for that pixel, and if a probability the pixel is likely to be foreground is greater than a second threshold value based on the foreground model for that pixel. The system may include a depth segmentation module configured to perform a depth segmentation process on the second subset of the plurality of pixels. The determined second subset may be representative of at least a portion of a control object. The system may include a hand detection module configured to determine an input to an application based at least in part on the second subset. Each foreground model of the plurality of foreground models may be created if a pixel corresponding to the foreground model represents a portion of a person.

Additionally or alternatively, embodiments of such a system may include one or more of the following: Each pixel of the image may include a depth value and an intensity value. The background modeling module may include a submodule configured to determine for each pixel at least a first and second statistical measure established over a first portion of the period of time based at least in part on the intensity value and the depth value for the pixel in multiple images of the plurality of images. The background modeling module may be further configured to create a second background model for a pixel of the plurality of pixels, wherein the second background model comprises at least a third and fourth statistical measure established for the pixel over a second portion of the period of time based at least in part on the intensity value and the depth value for the pixel in multiple images of the plurality of images. The system may include an extraction module is configured to receive an indication for each pixel of the first subset of pixels and a depth value for each pixel of the first subset of pixels, the indication being indicative that the pixel corresponds to a person. The image acquisition module may be configured to receive a second plurality of images of the scene captured over a second period of time. The background modeling module may be configured to update one or more background models of the plurality of background models based on the second plurality of images. The foreground modeling module may be configured to update one or more foreground models of the plurality of foreground models based on the second plurality of images. The plurality of background models and the plurality of foreground models may be used by an application for determining whether a user is present. The plurality of background models and the plurality of foreground models may be used by an application for determining whether an input has occurred.

In some embodiments, a non-transitory computer-readable medium having computer-readable instructions stored thereon is presented. The computer-readable instructions may be configured to cause a computer to receive a plurality of images of the scene captured over a period of time, each image comprising a plurality of pixels. The computer-readable instructions may be configured to cause a computer to create a plurality of background models using the plurality of images, wherein at least one background model is created for each pixel of the plurality of pixels. The computer-readable instructions may be configured to cause a computer to create a plurality of foreground models using the plurality of images, wherein a foreground model is created for each pixel of at least a first subset of pixels of the plurality of pixels. The plurality of background models and the plurality of foreground models may be indicative of the scene over the period of time.

In some embodiments, an apparatus is presented. The apparatus may include means for receiving a plurality of images of the scene captured over a period of time, each image comprising a plurality of pixels. The apparatus may include means for creating a plurality of background models using the plurality of images, wherein at least one background model is created for each pixel of the plurality of pixels. The apparatus may include means for creating a plurality of foreground models using the plurality of images, wherein a foreground model is created for each pixel of at least a first subset of pixels of the plurality of pixels. The plurality of background models and the plurality of foreground models may be indicative of the scene over the period of time.

Embodiments of such an apparatus may include one or more of the following: The apparatus may include means for determining a second subset of the plurality of pixels at least partially based on the plurality of background models and the plurality of foreground models. The second subset of the plurality of pixels may contain only some of the plurality of pixels. The apparatus may include means for outputting only the second subset of the plurality of pixels. The means for determining the second subset of the plurality of pixels at least partially based on the plurality of background models and the plurality of foreground models may include, for a pixel having a foreground model and a background model, means for determining if the pixel more likely corresponds to the foreground model or the background model. Means for determining the second subset of the plurality of pixels at least partially based on the plurality of background models and the plurality of foreground models may include, for a pixel having a foreground model and a background model, means for determining: if a probability the pixel is likely to be background is greater than a first threshold value based on the background model for that pixel, and if a probability the pixel is likely to be foreground is greater than a second threshold value based on the foreground model for that pixel. The apparatus may include means for performing a depth segmentation process on the second subset of the plurality of pixels. The determined second subset may be representative of at least a portion of a control object. The apparatus may include means for determining an input to an application based at least in part on the second subset. Each foreground model of the plurality of foreground models may be created if a pixel corresponding to the foreground model represents a portion of a person.

Additionally or alternatively, embodiments of such an apparatus may include one or more of the following: Each pixel of the image may include a depth value and an intensity value. Means for creating each background model of the plurality of background models may include means for determining for each pixel at least a first and second statistical measure established over a first portion of the period of time based at least in part on the intensity value and the depth value for the pixel in multiple images of the plurality of images. The apparatus may include means for creating a second background model for a pixel of the plurality of pixels, wherein the second background model comprises at least a third and fourth statistical measure established for the pixel over a second portion of the period of time based at least in part on the intensity value and the depth value for the pixel in multiple images of the plurality of images. The apparatus may include means for receiving an indication for each pixel of the first subset of pixels and a depth value for each pixel of the first subset of pixels, the indication being indicative that the pixel corresponds to a person. The apparatus may include means for receiving a second plurality of images of the scene captured over a second period of time. The apparatus may include means for updating one or more background models of the plurality of background models and foreground models of the plurality of foreground models based on the second plurality of images. The plurality of background models and the plurality of foreground models may be used by an application for determining whether a user is present. The plurality of background models and the plurality of foreground models may be used by an application for determining whether an input has occurred. The apparatus may include means for determining whether an object in a current image is in a foreground of the scene based at least in part on the plurality of background models and the plurality of foreground models, wherein the application determines whether the object has provided the input in response to determining that the object is in the foreground.

In some embodiments, a method may be presented. The method may include detecting an object at a first pixel of a plurality of pixels in a field of view of a camera. The method may include determining whether motion of the object comprises an instruction based at least in part on a background model of the pixel and one or more foreground models for at least one of the plurality of pixels. In some embodiments a method is presented comprising dynamically maintaining a plurality of background models of a scene and at least one foreground model of the scene over an elapsed time period. The method may involve maintaining the at least one foreground model based at least in part on a facial detector or person detector.

In some embodiments, a computer-implemented method is presented. The method may include generating a time-evolving foreground model and a time-evolving background model providing, for each point of a depth image, an associated likelihood that the point comprises a foreground of the depth image. The method may include performing a background extraction based on applying the time-evolving foreground model and the time-evolving background model to the depth image. The method may include detecting a control object based at least in part on the background extraction. The method may include performing a depth segmentation on at least a portion of the depth image based on applying the time-evolving foreground model, wherein the control object detection is based at least in part on the depth segmentation.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
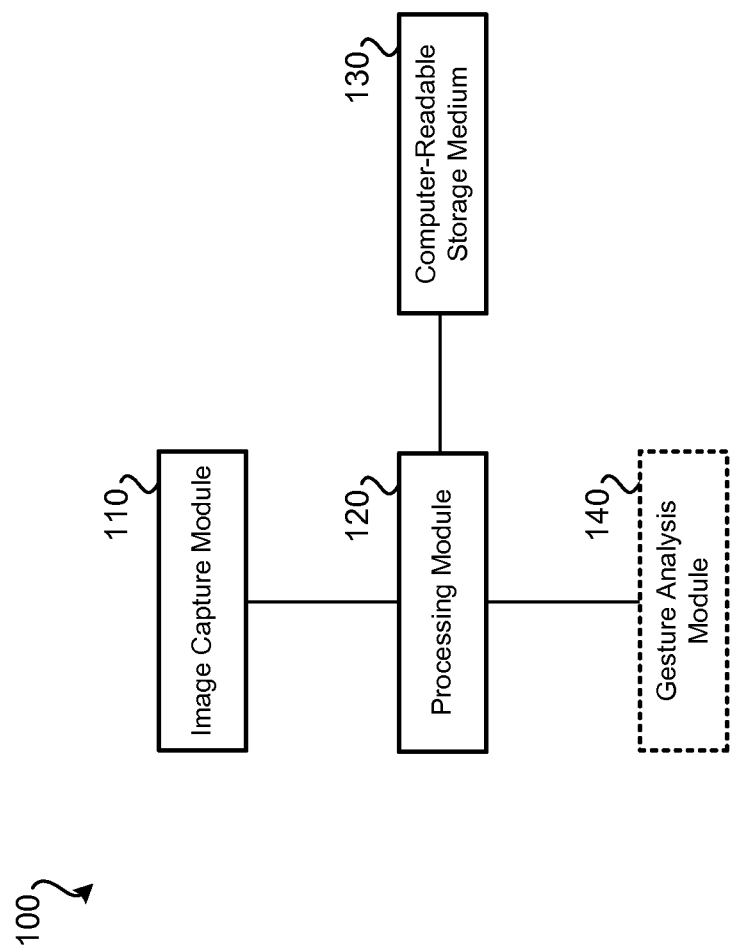
FIG. 1 illustrates an embodiment of a system for determining a gesture performed by a person.

A position of a portion of a person's body, such as a hand, may be tracked for various reasons. As an example, in order to detect a gesture being performed by a person, it may be useful to track a location of a portion of a person's body. For instance, if a gesture is performed by a hand, detecting the gesture may involve determining the position of the person's hand in multiple images. The position of a person's hand may be tracked using images from an image capture device. An image capture device may be used to capture multiple images of a scene. This scene may at times have none, one, or more than one persons present within it. Rather than analyzing the entirety of each image to determine if a person is performing a gesture, it may be possible to discard portions of some images as unlikely to contain a person and focus analysis on one or more portions of the images likely to contain a person, who may perform a gesture.

By not analyzing portions of images, the total amount of processing necessary to determine a location of a portion of a person's body may be decreased. As a simple example, if a person, table, chair, and bookcase are present within a scene being captured by an image capture device, it may be useful to ignore portions of the image containing the table, chair, and bookcase. Since only a location of a part of a person's body is desired, only the portions of the image containing the person may be worthwhile to process. As such, the portions of the scene where the table, chair, and bookcase are present may be ignored. This may result in only a smaller portion of the image requiring additional processing to determine a location of a portion of the person's body. Accordingly, the total amount of processing may be decreased by only analyzing for location portions of the image that may be part of a foreground that includes persons present in the scene. Further, not only may processing resources be conserved, but objects that are unlikely to provide a desired input (for example, people walking by the camera, things going on behind the user, etc.) may be ignored in some embodiments. Moreover, embodiments detailed herein may permit for a more accurate identification of foreground objects to be performed, which may enable accurate gesture detection.

One or more background models and foreground models may be created for a scene. Such models may be created and used on a pixel-by-pixel basis. A particular pixel may have one or more background models. Each of these background models may define one or more values, such as an intensity value and a depth value. As such, pixels of an image may have three-dimensional information. If the intensity value and/or depth value of a pixel has not changed over a significant period of time, it may be determined that the pixel likely corresponds to a background object. Common background objects include walls, furniture, the floor, lighting appliances, etc. for an indoor scene.

Multiple background models may be present for some pixels. While a background object may be less likely to move or otherwise change, such change may occur frequently enough that having multiple background models for a pixel is useful. For example, a cabinet present in a scene may typically be closed; thus, a background model may be created for pixels that correspond to the closed cabinet. However, if the cabinet is left open for a substantial period of time, a second background model (which may have a different depth value and/or intensity value) may be created for each pixel that corresponds to the open cabinet. In a later-captured image, if values of a pixel sufficiently correspond to either of the pixel's background models, it may be determined that the object represented by the pixel is part of the background of the scene.

In addition to one or more background models being created for individual pixels, foreground models may be created for individual pixels. Some pixels may have no models, a foreground model only, a background model only, multiple background models only, a background model and a foreground model, or multiple background models and a foreground model. A foreground model may be created for a pixel if it is determined part of a person is represented by the pixel. For gesture detection, since only people may perform a gesture, a foreground model only corresponds to locations of persons. More generally, if a location of part of a person's body is desired, the foreground model may be desired to only represent the person. An indication of pixels corresponding to persons may be provided by a hardware-based or software-based module configured to identify a person using techniques such as a head and shoulder principal component analysis. A control object may be used to perform a gesture or otherwise be tracked by the system. The control object may be, for example, a person's hand or something held or worn by the user. As an example, a wand may be a control object.

When a new image of a scene is received, which may happen multiple times per second, pixels of the image may be compared on a pixel-by-pixel basis with one or more background models for the pixel, if present, and a foreground model for the pixel, if present. Since it may take at least some time before a background model can be created for a pixel (because the pixel may need to remain approximately the same in intensity and depth for a time for the background model to be created), no background model may be present for the pixel. Based on a probability analysis, it may be determined whether a pixel is likely part of the background, foreground, or is part of an uncertain category.

If a pixel is determined to be part of the background, it may be ignored for further processing. Pixels that are uncertain or are part of the foreground may be subjected to further processing to find and track a location of part of the person (such as the person's hand).

FIG. 1 illustrates an embodiment of a system 100 for determining a gesture performed by a person. More generally, system 100 may be used for tracking a specific portion of a person. For instance, system 100 may be used for tracking a person's hands. System 100 may be configured to track one or both hands of a person simultaneously. Further, system 100 may be configured to track hands of multiple persons simultaneously. While system 100 is described herein as being used to track the location of persons' hands, it should be understood that system 100 may be configured to track other parts of persons, such as heads, shoulders, torsos, legs, etc. The hand tracking of system 100 may be useful for detecting gestures performed by the one or more persons. System 100 itself may not determine a gesture performed by the person or may not perform the actual hand identification or tracking in some embodiments; rather, system 100 may output a position of one or more hands, or may simply output a subset of pixels likely to contain foreground objects. The position of one or more hands may be provided to and/or determined by another piece of hardware or software for gestures, which might be performed by one or more persons.

Figure 19:
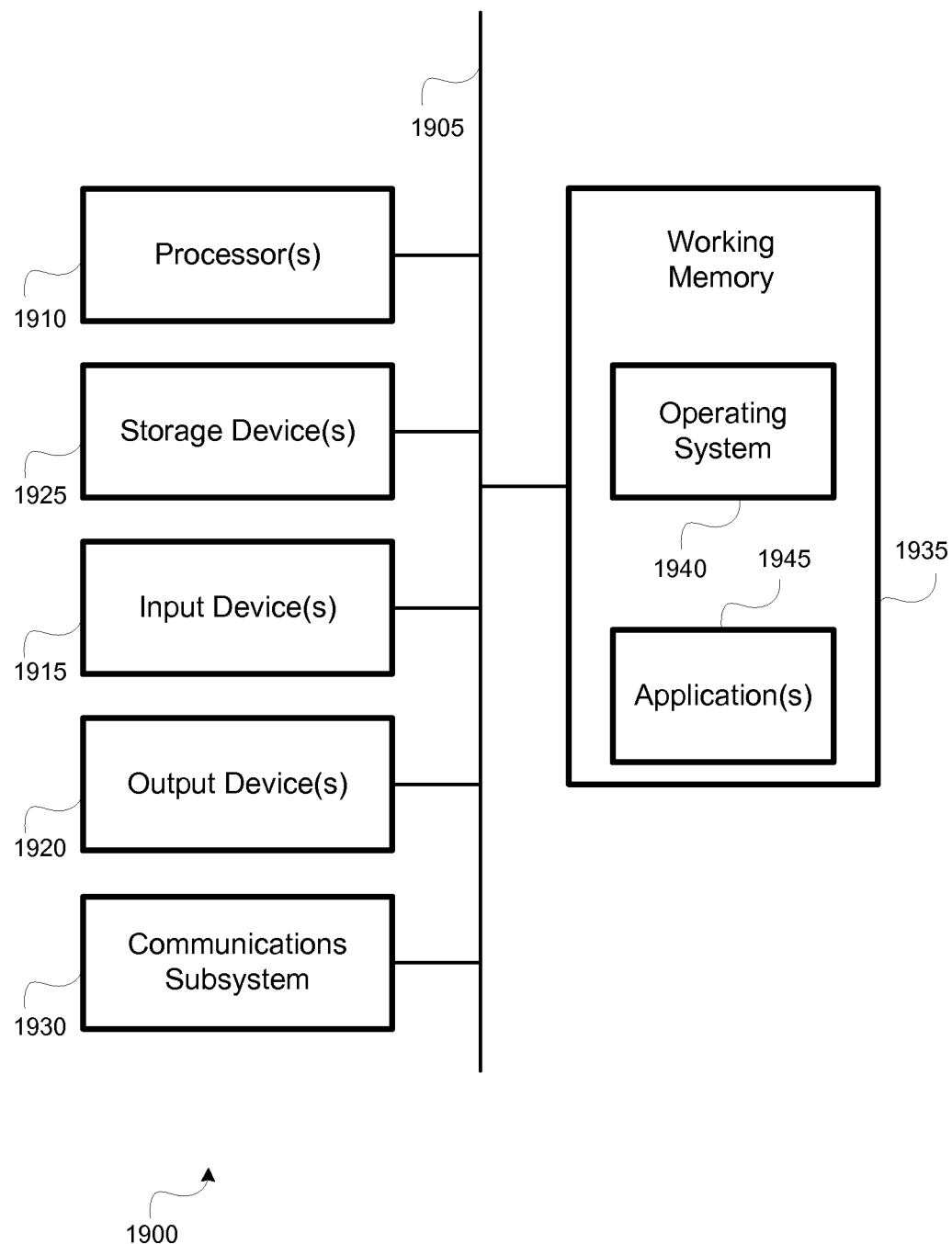
FIG. 19 illustrates an embodiment of a computer system.

System 100 may include image capture module 110, processing module 120, computer-readable storage medium 130, and gesture analysis module 140. Additional components may also be present. For instance, system 100 may be incorporated as part of a computer system, or, more generally, a computerized device. Computer system 1900 of FIG. 19 illustrates an exemplary computer system which may be incorporated with system 100 of FIG. 1. Image capture module 110 may be configured to capture multiple images. Image capture module 110 may be a camera, or, more specifically, a video camera. Image capture module 110 may capture a series of images in the form of video frames. These images may be captured periodically, such as 30 times per second. The images captured by image capture module 110 may include intensity and depth values for each pixel of the images generated by image capture module 110.

Image capture module 110 may project radiation, such as infrared radiation (IR) out into its field-of-view (e.g., onto the scene). The intensity of the returned infrared radiation may be used for determining an intensity value for each pixel of image capture module 110 represented in each captured image. The projected radiation may also be used to determine depth information. As such, image capture module 110 may be configured to capture a three-dimensional image of a scene. Each pixel of the images created by image capture module 110 may have a depth value and an intensity value. In some embodiments, an image capture module may not project radiation, but may instead rely on light (or, more generally, radiation) present in the scene to capture an image.

For depth information, the image capture module 110 may be stereoscopic (that is, image capture module 110 may capture two images and combine them into a single image having depth information) or may use other techniques for determining depth.

The images captured by image capture module 110 may be provided to processing module 120. Processing module 120 may be configured to acquire images from image capture module 110. Processing module 120 may analyze some or all of the images acquired from image capture module 110 to determine the location of one or more hands belonging to one or more persons present in one or more of the images. Processing module 120 may include software, firmware, and/or hardware. Further detail of processing module 120 is provided in reference to FIG. 2. Processing module 120 may be in communication with computer-readable storage medium 130. Computer-readable storage medium 130 may be used to store information related to background models and/or foreground models created for individual pixels of the images captured by image capture module 110. If the scene captured in images by image capture module 110 is static, it can be expected that a pixel at the same location in the first image and the second image corresponds to the same object. As an example, if a couch is present at a particular pixel in a first image, in the second image, the same particular pixel of the second image may be expected to also correspond to the couch. Background models and/or foreground models may be created for some or all of the pixels of the acquired images. Computer-readable storage medium 130 may also be configured to store additional information used by processing module 120 to determine a position of a hand (or some other part of a person's body). For instance, computer-readable storage medium 130 may contain information on thresholds (which may be used in determining the probability that a pixel is part of a foreground or background model) and/or may contain information used in conducting a principal component analysis (PCA), described in greater detail later in this document. Further, computer-readable storage medium 130 may store instructions for executing one or more methods or functions—as described in greater detail below—for example one or more of the methods 600, 700A, 700B, 800, and/or 900.

Processing module 120 may provide an output to another module, such as gesture analysis module 140. Processing module 120 may output two-dimensional coordinates and/or three-dimensional coordinates to another software module, hardware module, or firmware module, such as gesture analysis module 140. The coordinates output by processing module 120 may indicate the location of a detected hand (or some other part of the person's body). If more than one hand is detected (of the same person or of different persons), more than one set of coordinates may be output. Two-dimensional coordinates may be image-based coordinates, wherein an x-coordinate and y-coordinate correspond to pixels present in the image. Three-dimensional coordinates may incorporate depth information. Coordinates may be output by processing module 120 for each image in which at least one hand is located. Further, the processing module 120 may output one or more subsets of pixels having likely background elements extracted and/or likely to include foreground elements for further processing.

Gesture analysis module 140 may be any one of various types of gesture determination systems. Gesture analysis module 140 may be configured to use the two- or three-dimensional coordinates output by processing module 120 to determine a gesture being performed by a person. As such, processing module 120 may output only coordinates of one or more hands, determining an actual gesture and/or what function should be performed in response to the gesture may be performed by gesture analysis module 140. It should be understood that gesture analysis module 140 is illustrated in FIG. 1 for example purposes only. Other possibilities, besides gestures, exist for reasons as to why one or more hands of one or more users may be desired to be tracked. As such, some other module besides gesture analysis module 140 may receive locations of parts of persons' bodies.

Figure 2:
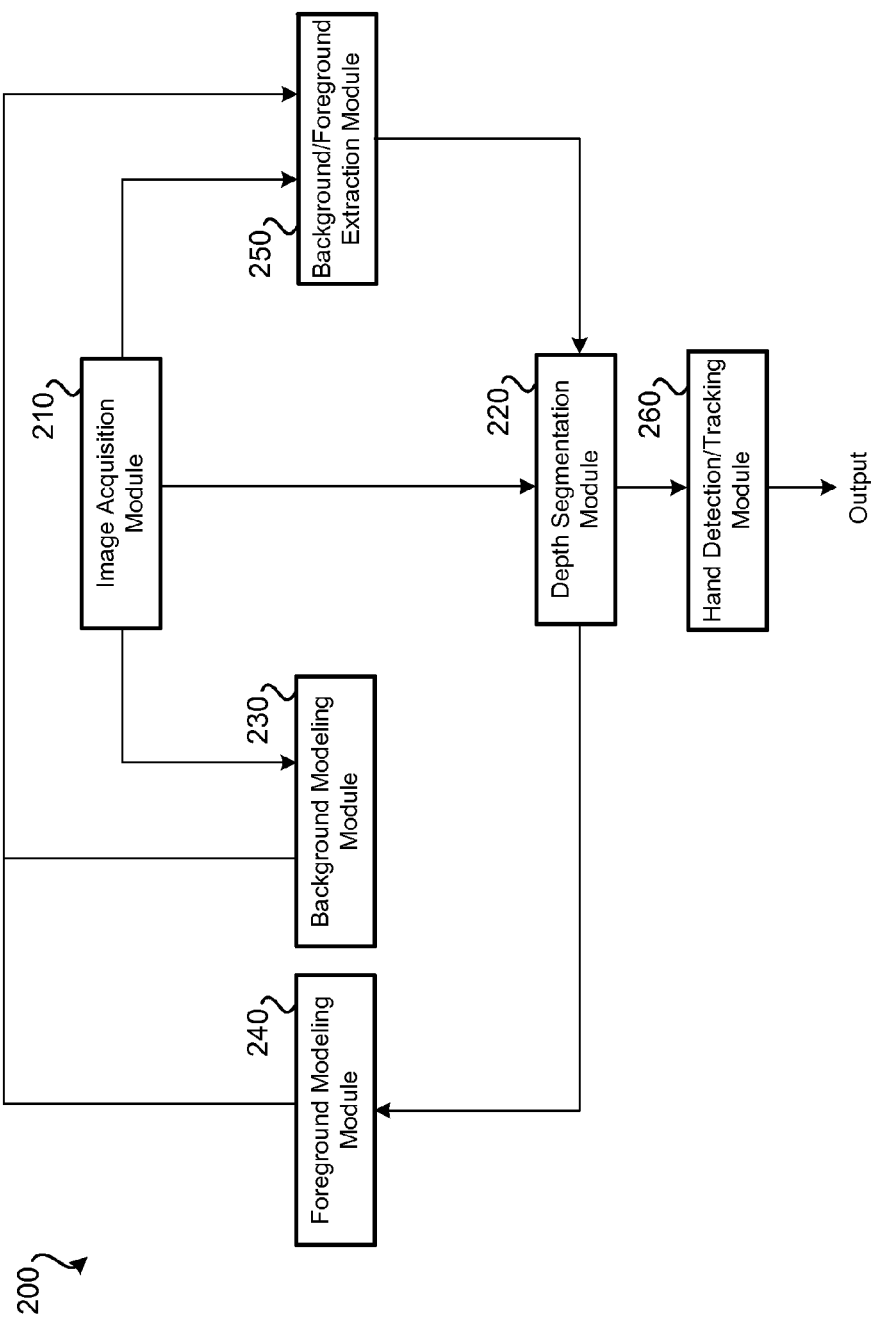
FIG. 2 illustrates an embodiment of a system for tracking a position of a person's hand.

FIG. 2 illustrates an embodiment of a system 200 for tracking a position of a person's hand. System 200 of FIG. 2 may be a subsystem of system 100 of FIG. 1. For instance, system 200 may be partially or wholly performed by processing module 120 of FIG. 1. Data stored within system 200 may be stored by computer-readable storage medium 130 of system 100. System 200 may also be incorporated as part of some type of gesture-detection system other than system 100. System 200 may be used for some purpose other than gesture detection. System 200 may output one or more subsets of pixels having likely background elements extracted and/or likely to include foreground elements for further processing. In some embodiments, system 200 may output locations of one or more hands of one or more persons, and such locations may be used for various purposes. Locations of other parts of a person may also be output. System 200 may include: image acquisition module 210, depth segmentation module 220, background modeling module 230, foreground modeling module 240, background/foreground extraction module 250, and hand detection/tracking module 260.

Image acquisition module 210 may acquire images from an image capture device, such as image capture module 110 of system 100. Images acquired by image acquisition module 210 may be acquired periodically, such as 30 times per second. As such, the images acquired by image acquisition module 210 may be video frames. Each image may contain multiple pixels and each pixel may have a depth value and an intensity value. The depth value and intensity value may be collectively referred to as a feature vector. The feature vector may be created by the image acquisition module 210 from the raw image data acquired from the image capture device.

Depth segmentation module 220 may be configured to segment an image into multiple objects based on the depth information associated with each pixel. When system 200 is initially operated, no background models and no foreground models may be present for pixels. As such, background/foreground extraction module 250 may not yet be functional. Accordingly, depth segmentation module 220 may initially receive images from image acquisition module 210 without any pixels having been extracted by background/foreground extraction module 250. Depth segmentation module 220 may determine which pixels present within acquired images are connected and should be treated as a single object, perform a principal component analysis to identify one or more persons, and perform a body parameter estimate. Indications of which pixels are determined to correspond to a person may be output to foreground modeling module 240. The pixels output to foreground modeling module 240 by depth segmentation module 220 may include the feature vector of the pixel having a depth value and an intensity value. Further detail of the performance of depth segmentation module 220 is provided later in this document.

Background modeling module 230 may create one or more background models for one or more pixels in the images acquired by image acquisition module 210. Background models created by background modeling module 230 are intended to correspond to objects within the scene of the images acquired by image acquisition module 210 that remain unchanged for at least a threshold period of time.

Since a function of system 200 is to determine the location of one or more hands of one or more persons, objects other than persons are desired to be treated as background. Since static objects do not often move, the depth and intensity of pixels within acquired images that correspond to static objects may remain approximately constant in value for lengthy periods of time.

As an example of objects that may be associated with background models, consider a typical living room: a couch may face a television. To either side of the couch may be end tables. Upon each end table may be a lamp and a family picture. Behind the couch may be a wall with one or more pictures, bookcases, etc. In front of the couch may be a coffee table. Typically, each of these objects may not be moved. For instance, significant periods of time (e.g., days, weeks, months, years) may elapse without the couch, lamps, tables, or pictures being moved. Accordingly, in each image acquired by image acquisition module 210, the lamp, for example, may appear in the same location in the images. Therefore, the same pixel in multiple images may represent a portion of the lamp. Since the lamp's position is not changing, the intensity value and depth value of this pixel is unlikely to substantively change from one image to the next.

Background models may be created on a pixel-by-pixel basis. Accordingly, a background model may correspond to a particular pixel across multiple images acquired by image acquisition module 210. If a feature vector of a pixel does not substantively change for a period of time, it may be determined that the pixel represents at least a portion of an object that is part of the background. Typically, when a person is present in a scene, the person exhibits some level of movement. For example, a person watching television may periodically leave the scene or shift in position. As such, to build background models for pixels, the period of time over which a pixel's feature vector is required to remain at least approximately unchanged may be multiple hours. Since over a period of multiple hours it can be expected that a person will exhibit some level of motion, the person will not be taken as part of the background model.

To create a background model for a pixel, the feature vector of a pixel present in images acquired by image acquisition module 210 is monitored for at least a pre-defined threshold period of time (such as 5 hours) by background modeling module 230. If the feature vector of the pixel has remained unchanged (within a predefined threshold range for intensity and depth to account for measurement errors), the pixel may be determined by background modeling module 230 to correspond to a background object. A background model may be created using the feature vector ($D_1$, $I_1$) of the pixel (pixel 1) that has remained unchanged for at least the threshold period of time.

Using the feature vector, a Gaussian mixture model (GMM) may be generated by background modeling module 230 for the pixel. The mean for the GMM may be ($D_1$, $I_1$) with a variance of ($Var_{D1}$, $Var_{I1}$). Each GMM may be stored as the background model for the pixel. Background models may be created by background modeling module 230 for none, some, or all pixels at the same or at different times. A pixel may not have a background model initially and/or if the pixel's feature vector has not remained unchanged for at least the threshold period of time. Background models created by background modeling module 230 may be provided to background/foreground extraction module 250. The Gaussian components of the GMM for each background model may be stored along with an indication of the corresponding pixel (e.g., a two-dimensional coordinate that may be used to locate the pixel in images acquired by image acquisition module 210).

Multiple background models may be created for one or more of the pixels by background modeling module 230. While objects in the background of a scene may be expected to not change, that is not to say such objects never change. As an example, consider a scene having a cabinet. Often, the cabinet is closed for hours at a time. A background model may be created for each pixel that represents the closed cabinet. A person may also leave the cabinet open for hours at a time. Additional background models may be created for each pixel that represents the open cabinet. As such, a separate background model may be present for the same pixel for the cabinet whether open or closed. When the feature vector of a pixel remains unchanged for at least a predefined threshold period of time, a background model may be created for the pixel, regardless of whether another background model has previously been created for the particular pixel. Further, having a plurality of background models may account for slight variations in camera position in some embodiments. For example, while a portion of a couch may generally be expected at a certain pixel, that pixel may correspond to a portion of a wall when the camera has been rotated slightly.

In some embodiments, a pixel may have a maximum number of background models, such as 2, 3, or 4. If a pixel already has the maximum number of background models and a new background model is created for the pixel, the oldest background model for the pixel may be deleted.

Foreground modeling module 240 may create foreground models for individual pixels independently from the background models created by background modeling module 230 for individual pixels. As such, a pixel that has zero, one, or more than one background model may or may not have a foreground model. The presence or lack of a background model for a pixel may not affect the creation of a foreground model for the same pixel; likewise, the presence or lack of a foreground model for the pixel may not affect the creation of a background model for the pixel. A foreground model for a pixel may be created if it has been determined that a person is represented by the pixel. In some embodiments, that is the only time the foreground model is created. An indication of which pixels represent a person may be provided to foreground modeling module 240 by depth segmentation module 220. Which pixels correspond to a person may be determined based on a principal component analysis (PCA) conducted by a module. The principal component analysis may be used to identify an object that likely corresponds to a head and shoulders of a person. Other ways of detecting a person may involve facial detection or an anatomical model. Foreground modeling module 240 may be used to determine the depths at which a person is likely to be detected. For instance, in a scene where a couch is positioned behind a coffee table, it may be significantly more likely that a person will be detected sitting on the couch than sitting on the coffee table. The likelihood that a person is present at particular depths and/or locations within the images of a scene may be used in assisting to extract the background from images by background/foreground extraction module 250.

For each pixel that foreground modeling module 240 has been notified corresponds to a person, a voting array may be created. The voting array may be of length L. L may be determined according to equation 1.

$$L = \frac{R}{\delta} \qquad \text{Eq. 1}$$

In equation 1, δ represents the depth resolution of the images and R represents the maximum depth range of depth values acquired by image acquisition module 210. When a pixel is determined to be occupied by a person at a particular depth, the depth may receive a "vote" in the pixel's array at the element corresponding to the depth. Over time, one or more local maximums may develop within an array (that is, one or more elements within the array that are greater in magnitude than neighboring elements) and one or more local minimums may develop within the array (that is, one or more elements within the array that are smaller in magnitude than neighboring elements). The width, in elements, of local maximums may be determined based on the location of adjacent local minimums. For each of the local maximums for the pixel, a Gaussian mixture model may be generated using the pixel's feature vector, having the form $(D_i, I_i)$, $(Var_{Di}, Var_{Ii})$ if a GMM has not previously been generated for the pixel. In order to preserve processing power, the arrays for pixels may be populated while a person is present within images acquired by image acquisition module 210; however, the GMM for individual pixels for foreground models may only be computed by foreground modeling module 240 when no person is detected within the scene in images acquired by image acquisition module 210.

The foreground models created by foreground modeling module 240 and the background models created by background modeling module 230 may be provided to (or may be accessible by) background/foreground extraction module 250. Collectively, creating the foreground models and background models by foreground modeling module 240 and background modeling module 230, respectively, may be referred to as environmental modeling. As the number of images acquired by image acquisition module 210 increases, the number of pixels having background models and/or foreground models may increase, thus providing a more detailed environmental model. Such a more detailed environmental model may permit a greater number of pixels to be categorized as background and ignored from additional processing to determine a location of part of a person's body.

Once at least one background model has been created for one or more pixels, background/foreground extraction module 250 may be used to determine portions of images acquired by image acquisition module 210 that may be discarded. When background/foreground extraction module 250 has at least one background model, image acquisition module 210 may not pass acquired images in full to depth segmentation module 220. On a pixel-by-pixel basis, background/foreground extraction module 250 may analyze acquired images. If one or more background models are available for a pixel, a probability ($P_B$) that the pixel in the acquired image corresponds to one of the background models may be calculated. Similarly, if a foreground model is available for the pixel, a probability ($P_F$) that the pixel in the acquired image corresponds to the foreground model may be calculated. It may then be determined whether it is more likely the pixel corresponds to the background model or the foreground model, that is $P_B > P_F$ or $P_B < P_F$.

If $P_B > P_F$ and $P_B$ is greater than a pre-defined threshold probability level (T), this pixel may be classified as background by background/foreground extraction module 250. If $P_F > P_B$ and $P_F$ is greater than a pre-defined threshold probability level (T), this pixel may be classified as foreground by background/foreground extraction module 250. If a pixel is classified as neither background or foreground (that is, $T > P_F$ and/or $T > P_B$ or no background or foreground model is available), the pixel may be classified as uncertain by background/foreground extraction module 250. The greater the threshold value T, the less variance from the foreground and background models may be tolerated. Increasing T may result in an increase in the number of pixels classified as uncertain.

Pixels that have been labeled as background may not be passed to depth segmentation module 220 for additional processing. Accordingly, only pixels identified as foreground or uncertain are passed to depth segmentation module 220 for additional processing. Therefore, if at least one pixel is identified as background, the size of the images (e.g., the number of pixels) processed by depth segmentation module 220 may be reduced. Accordingly, the amount of processing required to be performed by depth segmentation module 220 may be reduced, thus possibly resulting in faster processing and/or less processing resources being needed.

Images received by depth segmentation module 220 from background/foreground extraction module 250 may be reduced in size with various pixels having been removed. These pixels may have been identified by background/foreground extraction module 250 as representing a background object. As an example, consider a scene where a person is watching television. In the scene, the person is seated on a couch, with end tables at either side of the couch, and each end table supporting a lamp. Behind the couch may be wall. If system 200 has been activated for a substantial period of time, such as several days, a background model may be present for a significant number of pixels of the images acquired by image acquisition module 210. Pixels that represent the couch, end tables, lamps, and wall may all be extracted by background/foreground extraction module 250 as part of the background. As such, depth segmentation module 220 may receive only a substantially smaller portion of the image for processing. This smaller image may include the person watching television and, possibly, objects that were moved by the person, such as a throw pillow, and/or cushions of the couch affected by the person's presence (e.g., weight upon the couch).

In some embodiments, results of the scene modeling and/or foreground and/or background determinations may be output to a hand detection/tracking module, for example the hand detection/tracking module 260. The hand detection/tracking module may be separate from or included in the system 200. The hand detection/tracking module may receive input from depth segmentation module 220. Depth segmentation module 220 may identify the location of one or more persons, if any, present in the reduced images received from background/foreground extraction module 250. The hand detection/tracking module may serve to locate and track a position of one or both of the person's hands (or of multiple persons' hands, if multiple persons are present). The output from the hand detection/tracking module may be three-dimensional and/or two-dimensional coordinates that indicate a position of a hand. If multiple hands are detected (whether belonging to the same person or multiple persons) multiple sets of coordinates may be output. This output may be provided to another hardware, firmware, and/or software module, such as gesture analysis module 140 of FIG. 1. In some embodiments, the hand detection/tracking module is omitted. For example, results of the scene modeling and/or foreground and/or background determinations may be saved without performing a hand detection thereon, or the results of the scene modeling and/or foreground and/or background determinations may be input directly into a gesture analysis module, for example the gesture analysis module 140.

Figure 3:
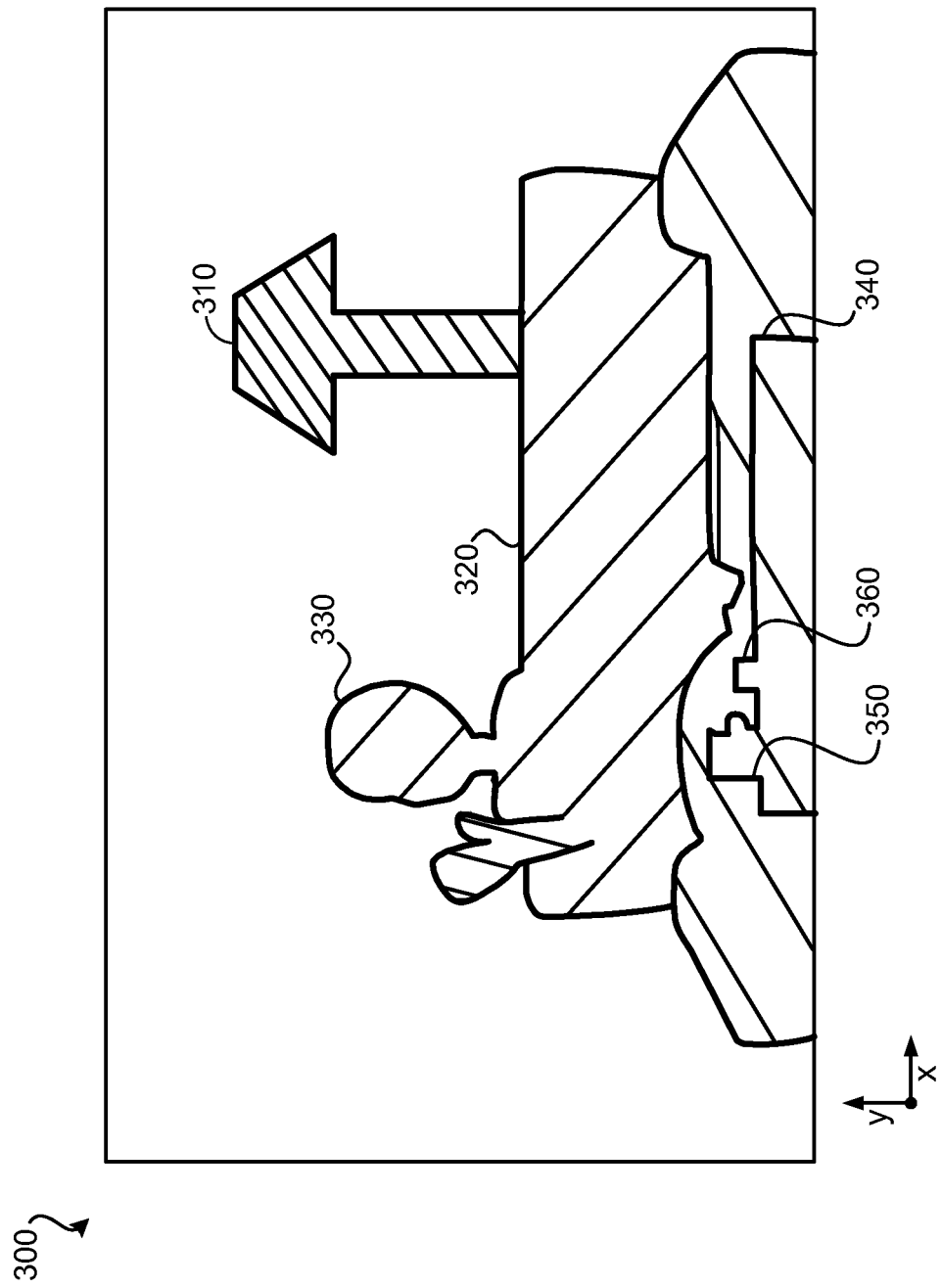
FIG. 3 illustrates an embodiment of an image of a scene captured by an image capture module.

FIG. 3 illustrates an embodiment of an image 300 of a scene captured by an image capture module. Image 300 may represent an image captured by image capture module 110 of FIG. 1 and acquired by image acquisition module 210 of system 200 of FIG. 2. Each pixel present in image 300 may include depth and intensity data. In the two-dimensional representation of image 300 (as illustrated) only the intensity data is illustrated. Image 300 is of a scene having a lamp 310 located behind a couch 320. Upon couch 320, a person 330 is seated with his hand raised. In front of couch 320 is a coffee table 340 supporting a mug 350 and a small object 360.

In image 300, since different objects may have similar intensity, the objects may appear as a single object. For instance, referring to person 330 and couch 320, the person's torso may be substantially indistinguishable from couch 320 using intensity values alone. Image 300 may represent an image that may be passed by image acquisition module 210 to depth segmentation module 220, background/foreground extraction module 250, and/or background modeling module 230. Such an image may be acquired 30 times every second or at some other interval. Ideally, since the embodiments of the system and methods detailed herein are directed to identifying the location of a person (and, more specifically, a part of a person, such as a hand), background objects are ignored. Objects such as lamp 310, some or all of couch 320, and coffee table 340 may be extracted and ignored from processing by depth segmentation module 220 if a background model is present for the pixels that correspond to each of these objects.

Other objects in image 300 may not be excluded using background models for particular pixels. For example, referring to mug 350 and small object 360, the person (or someone else) may have recently placed these objects on table 340. As such, these objects may not have been present in the scene for a long enough period of time for a background model to be created for the corresponding pixels. As such, pixels of images that correspond to mug 350 and small object 360 may be categorized as uncertain by background/foreground extraction module 250 of system 200.

Figure 4:
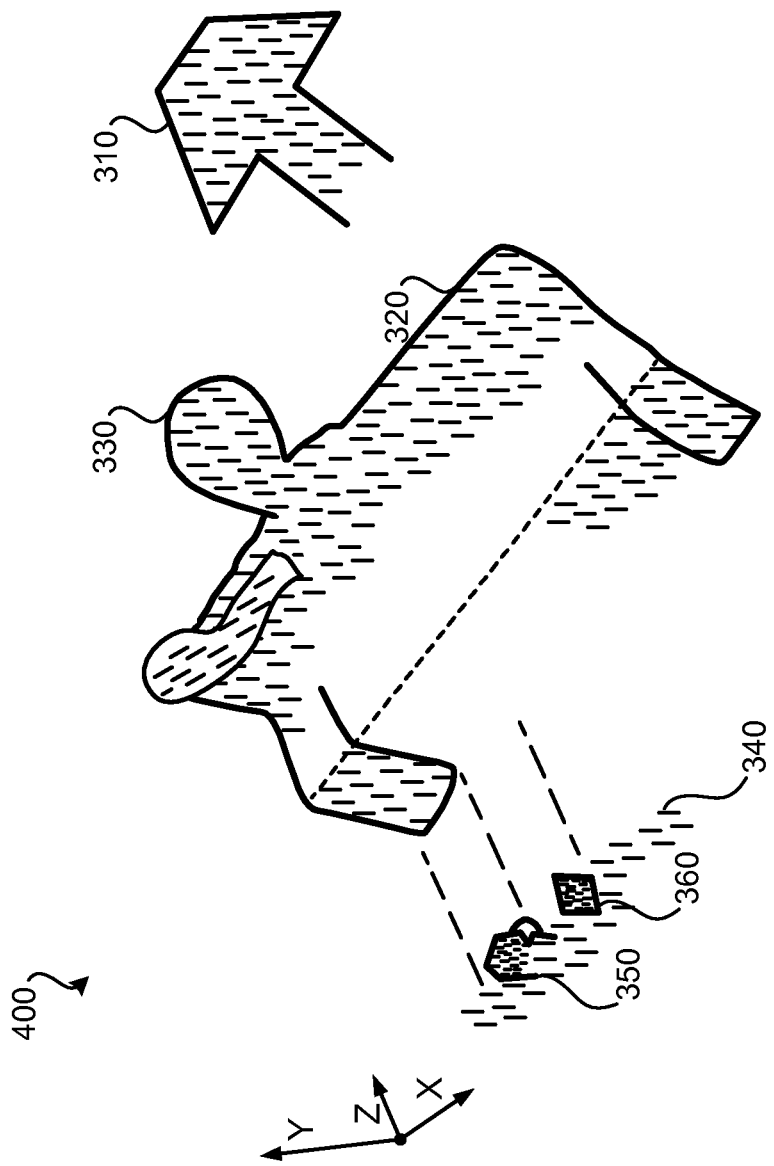
FIG. 4 illustrates an embodiment of a point cloud of a scene captured by an image capture module.

FIG. 4 illustrates an embodiment of a point cloud 400 of the scene captured by the image capture module. Point cloud 400 illustrates each pixel of image 300 based on each pixel's depth value. As such, point cloud 400 is a three-dimensional representation of the pixels of image 300. Point cloud 400 does not illustrate the intensity data presented in image 300. Objects that appeared as a single object in image 300 may be more clearly distinguishable when depth data for each pixel is analyzed. Referring to person 330 and couch 320, in image 300, the person's torso and couch 320 may be difficult to distinguish. However, if depth data for each pixel is analyzed, the body of person 330 may extend outward from the surface of couch 320 and can be distinguished.

Figure 5:
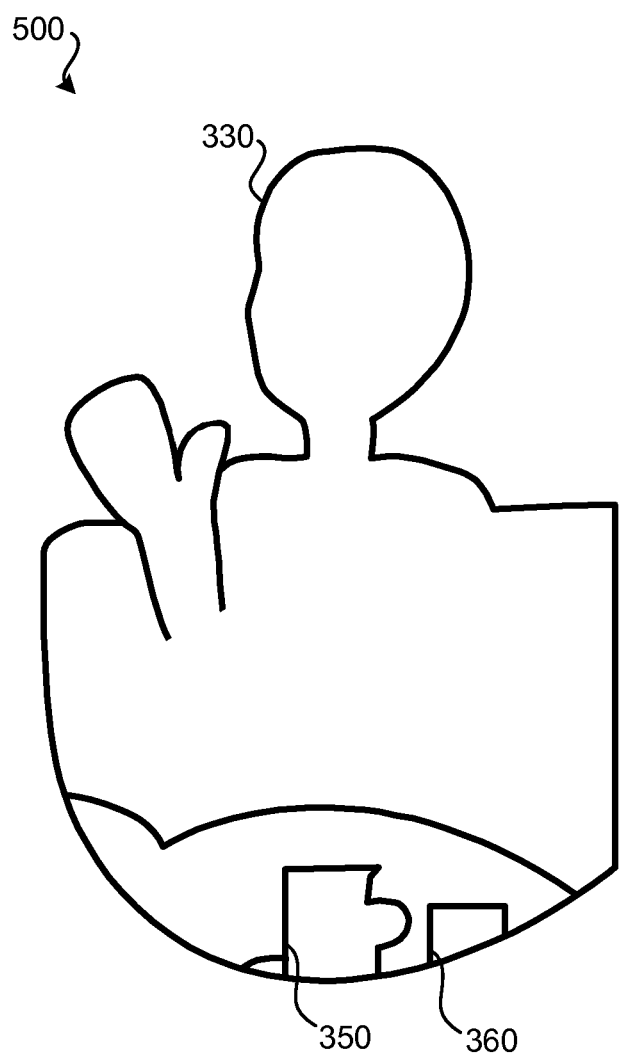
FIG. 5 illustrates an embodiment of an image created from an image of a scene created using multiple background models and/or multiple foreground models.

FIG. 5 illustrates an embodiment of an image 500 created from an image of a scene created using one or more background models and/or one or more foreground models to extract pixels determined to correspond to the background. Image 500 may be created based on image 300 of FIG. 3. Each pixel of image 500 may include a depth value and an intensity value. Image 300 of FIG. 3 may be acquired by image acquisition module 210 of FIG. 2. Background models and/or foreground models for at least some pixels were created by background modeling module 230 and foreground modeling module 240, respectfully, of system 200.

In image 500 of FIG. 5, pixels pertaining to person 330, mug 350, and small object 360 were not extracted from image 300 by background/foreground extraction module 250. These pixels did not match (or did not have) a background model for the pixel. Each pixel that was discarded, such as pixels corresponding to lamp 310 of FIG. 3, were each determined to sufficiently match a background model for the pixel. Image 500 contains pixels that were determined as sufficiently matching a foreground model and/or were classified as uncertain (not sufficiently matching a foreground model or a background model). Image 500 contains fewer pixels than image 300 of FIG. 3. Image 500 may be passed by background/foreground extraction module 250 to depth segmentation module 220 of system 200 for additional processing. The processing performed by depth segmentation module 220 may be less computationally expensive because fewer pixels need to be processed.

Figure 6:
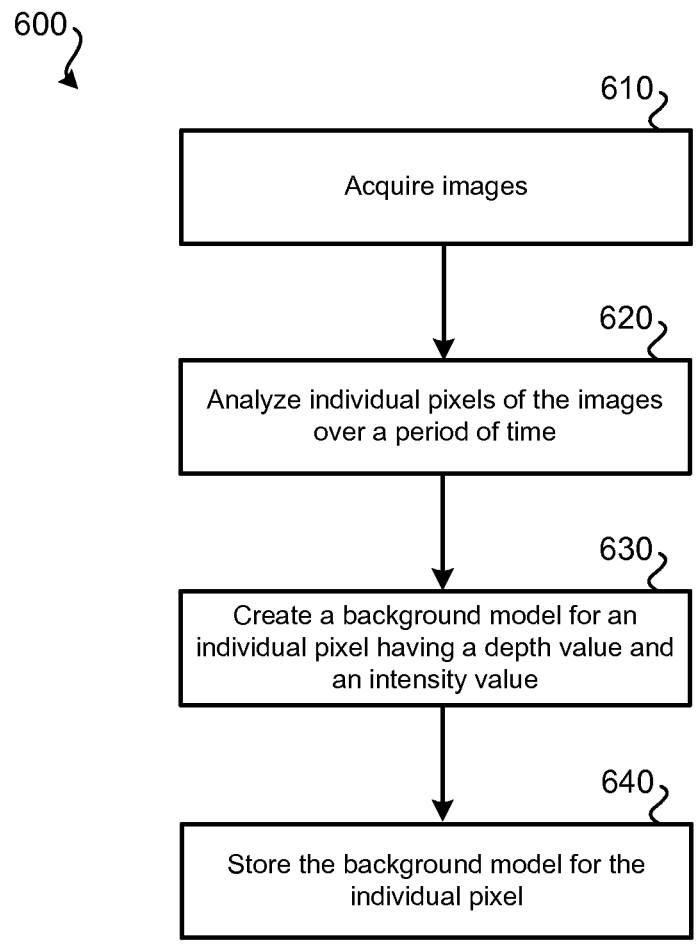
FIG. 6 illustrates an embodiment of a method for creating background models for individual pixels.

Systems 100 and 200 of FIGS. 1 and 2, respectively, may be used to perform various methods. FIG. 6 illustrates an embodiment of a method 600 for creating a background model. Method 600 may be performed by a processing device, such as processing module 120 of FIG. 1. As such, means for performing method 600 may include one or more computer systems (which may include one or more processors). Means for performing method 600 may include components of system 100 of FIG. 1. More specifically, steps of method 600 may be performed by background modeling module 230, image acquisition module 210, and/or background/foreground extraction module 250 of system 200. As such, means for performing each step of method 600 may include system 200 and, more specifically, background modeling module 230.

At step 610, images may be acquired. Each image may include a plurality of pixels, each pixel having an intensity value and a depth value. In some embodiments, intensity and depth values are not both present. Color values may be present instead or in addition. Referring to system 200 and system 100, each image may be acquired by image acquisition module 210 from image capture module 110, which may be a camera. Each image may be of the same scene. For example, the image capture module may be pointed at the contents of a room. The image capture module may be left stationary such that the scene in the image capture module's field-of-view does not substantially change. Means for performing step 610 may include one or more processors, an image acquisition module, an image capture module, and/or any of the means discussed generally in reference to method 600.

For each image acquired at step 610, some or all pixels of the image may be individually analyzed to create a background model for that pixel at step 620. A particular pixel may be present in each image acquired at step 610. For example, a pixel within a first image acquired at step 610 is present at the same coordinates in subsequent images acquired at step 610. A background model for a particular pixel may be unaffected by other pixels, including those pixels adjacent to the particular pixel. Analyzing an individual pixel may include monitoring the intensity and/or depth value for the pixel across multiple images acquired at step 610. For instance, the depth and/or intensity values of a particular pixel may be monitored to see if the values each remain constant, within a threshold range, over a period of time. Such a period of time may be defined to be several minutes, hours, or even days. A lengthy period of time over which individual pixels are analyzed to create a background model may result in the background model being more likely to accurately represent a background object that corresponds to the particular pixel. Means for performing step 620 may include one or more processors, a background modeling module, and/or any of the means discussed generally in reference to method 600.

If a particular pixel is analyzed and is determined to have remained constant, within a threshold range, for a threshold period of time in intensity and/or depth across the images acquired during the period of time, a background model may be created at step 630 for the pixel. Whether a background model is created for a particular pixel may be irrespective of whether a background was previously created for the pixel. The background model may be a Gaussian Mixture Model (GMM) having the form of $(D_i, I_i)$, $(Var_{Di}, Var_{Ii})$. $(D_i, I_i)$ may represent the observed constant depth and intensity of the pixel over the period of time. $(Var_{Di}, Var_{Ii})$ may represent a predetermined amount of variance that is used for each pixel's background model(s) or may represent variances that are calculated based on slight variances in measured depth and measured intensity during the period of time when the pixel remained approximately constant. Means for performing step 630 may include one or more processors, a background modeling module, and/or any of the means discussed generally in reference to method 600.

At step 640, the background model for the pixel may be stored, such as at computer-readable storage medium 130 of FIG. 1. The background model may be stored with an indication of the associated pixel and may be made available to background/foreground extraction module 250 of FIG. 2. Means for performing step 640 may include one or more processors, a background modeling module, a (non-transitory) computer-readable storage medium and/or any of the means discussed generally in reference to method 600.

While step 630 and step 640 of method 600 focus on the creation of a background model for a single pixel, background models may also be created for other pixels. As such, some or all pixels may have an associated background model. A pixel may not have a background model if the pixel has not remained constant long enough in intensity and/or depth for a background to be created. Systems 100 and 200 may be continuously acquiring images. As such, creating background models for each pixel may continuously be performed. Each pixel may be analyzed in each acquired image to determine if the pixel has remained constant for long enough for a background model to be created. More than one background model may be present for individual pixels. As such, zero, one, or more than one background model may exist for a particular pixel. A maximum number of background models for a pixel may exist. For example, a maximum number of five background models per pixel may be established. If a pixel has five background models and a sixth background model is created, the oldest background model for the pixel may be discarded (e.g., a first-in, first-out arrangement).

The analyzing of pixels of images at step 620 and creation of background models at step 630 may be performed by background modeling module 230 concurrently with the same image being processed by background/foreground extraction module 250. Therefore, while background models are created by background modeling module 230, the background models are used by background/foreground extraction module 250 to determine whether pixels should be extracted from an image received from image acquisition module 210.

Figure 7A:
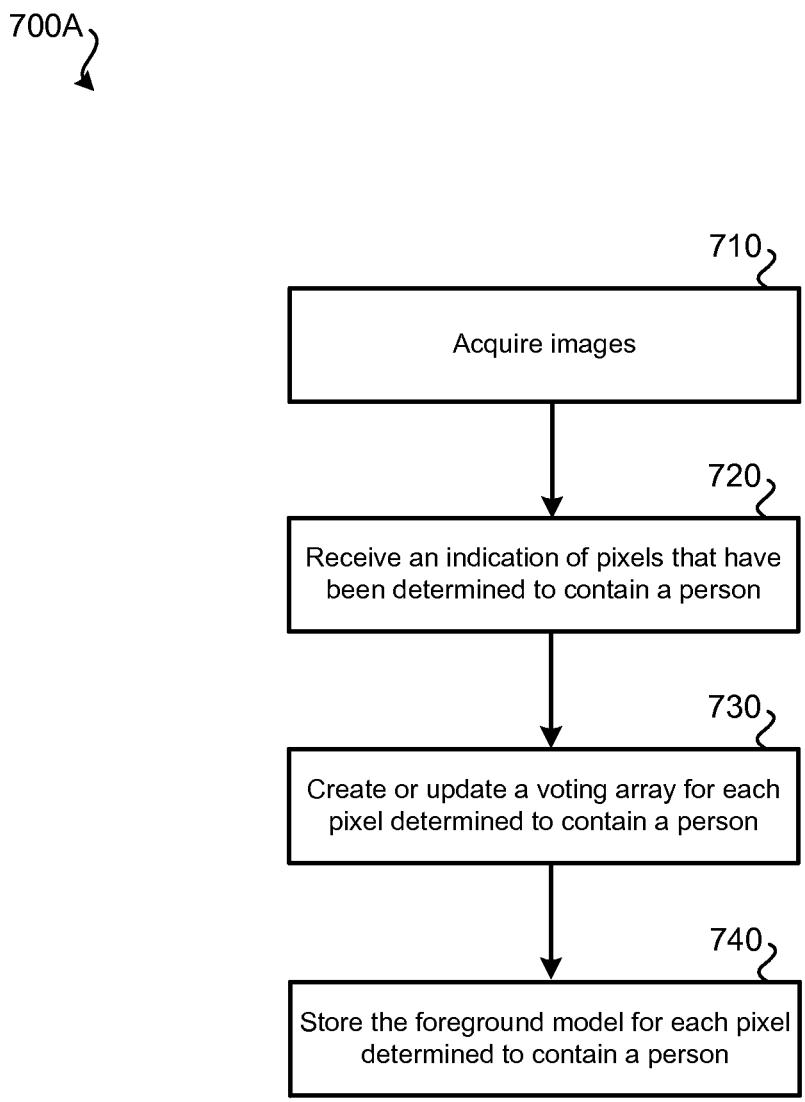
FIG. 7A illustrates an embodiment of a method for creating foreground models for individual pixels.

While method 600 focused on the creation of background models for individual pixels, FIG. 7A illustrates an embodiment of a method 700A for creating a foreground model for individual pixels. Method 700A may be performed by a processing device, such as processing module 120 of FIG. 1. As such, means for performing method 700A may include one or more computer systems (which may include one or more processors). Means for performing method 700A may include components of system 100 of FIG. 1. More specifically, steps of method 700A may be performed by foreground modeling module 240, image acquisition module 210, depth segmentation module 220, and/or background/foreground extraction module 250 of system 200. As such, means for performing each step of method 700A may include system 200 and, more specifically, foreground modeling module 240.

At step 710, images may be acquired. Each image may include a plurality of pixels, each pixel having an intensity value and a depth value. Referring to system 200 and system 100, each image may be acquired by image acquisition module 210 from image capture module 110, which may be a camera. Each image may be of the same scene. For example, the image capture module may be pointed at the contents of a room. The image capture module may be left stationary such that the scene in the image capture module's field-of-view does not substantially change. Means for performing step 710 may include one or more processors, an image acquisition module, an image capture module, and/or any of the means discussed generally in reference to method 700A.

The images acquired at step 710 may be processed by background/foreground extraction module 250, and/or background modeling module 230. Depth segmentation module 220 may process an image (which may have had pixels identified as corresponding to a background model extracted). The depth segmentation module 220, upon identifying one or more persons, may output the pixels corresponding to the one or more persons to foreground modeling module 240. As such, at step 720, foreground modeling module 240 may receive indications of pixels that are determined to correspond to one or more persons. These pixels may or may not have a background model. Since foreground models are created independent of background models, the existence of one or more background models for a pixel may be irrelevant to the creation of a foreground model for the pixel. Additional information as to how depth segmentation module 220 identifies the presence of a person is detailed later in this document. Means for performing step 720 may include one or more processors, a depth segmentation module, a foreground modeling module, and/or any of the means discussed generally in reference to method 700A.

At step 730, for each pixel that was received at step 720, a voting array may be created (if one does not already exist) or the voting array may be modified (if a voting array already exists). As previously described in relation to equation 1, $\delta$ represents the depth resolution of the images and R represents the maximum depth range of depth values acquired at step 710. When a pixel is determined to be occupied by a person at a particular depth, the depth may receive a "vote" in the pixel's array at the array element corresponding to the depth. Over time, one or more local maximums may develop within a pixel's voting array (that is, one or more elements within the array that are greater in magnitude than other elements) and one or more local minimums may develop within the array (that is, one or more elements within the array that are smaller in magnitude than other elements). The width, in elements, of local maximums may be determined based on the location of adjacent local minimums. For each of the local maximums for a pixel, a Gaussian mixture model (GMM) may be generated for the pixel's feature vector, having the form $(D_i, I_i)$, $(Var_{Di}, Var_{Ii})$. This model may be used as the foreground model for the pixel. A pixel may be restricted to having one foreground model or may have multiple foreground models.

In order to preserve processing power, the arrays for pixels may be populated while a person is present within images being acquired; however, the Gaussian mixture models for individual pixels for foreground models may only be computed by a foreground modeling module when no person is detected within the scene of acquired images. For example, step 710 may be being performed continuously, with 30 images per second being captured. For each (or some) of these acquired images, indications may be received by the foreground modeling module of which pixels correspond to a person in the scene. While such indications of pixels are being received, the voting arrays of individual pixels may be updated, but the Gaussian mixture models created using the arrays may not be calculated until pixels that indicate the presence of a person have not been received for a threshold period of time (e.g., one minute). Such an arrangement may prevent the foreground models for pixels from continually being calculated and potentially consuming excessive processing resources. Means for performing step 730 may include one or more processors, a foreground modeling module, and/or any of the means discussed generally in reference to method 700A.

At step 740, the foreground models, which may be Gaussian mixture models, created for individual pixels may be stored. These foreground models may be transmitted to and/or made available to a background/foreground extraction module. By having foreground models for pixels, a person present at the pixel may be less likely to be incorrectly identified as background if a foreground model is available. Typically, a person does not appear at random depths within a scene. Referring to image 300 of FIG. 3, a person may be more likely to be seated on the couch than seated on the table in front of the couch. Since the GMM for a pixel is created based on depth and intensity data when the pixel is known to be occupied by a person, the GMM can be expected to accurately model future occurrences of a person at the pixel (for example, if a person sits on a couch, it is likely someone else will also sit on the couch in the future). Means for performing step 740 may include one or more processors, one or more (non-transitory) computer-readable storage medium, a foreground modeling module, and/or any of the means discussed generally in reference to method 700A.

Method 700A may be being performed concurrently with method 600 of FIG. 6. For instance, while foreground models are being created for one or more pixels, background models may be created for other pixels. A particular pixel may at one point, when its intensity and/or depth has not varied substantially for a period of time, have a background model created for it while at another time, when a person is determined to correspond to the pixel, the pixel may have a foreground model created for it.

Creation of background and/or foreground models may be an on-going process. As such, additional background models for a pixel may be created to supplement or replace other background models for that pixel. Likewise, a foreground model for a pixel may be supplemented or replaced with a new foreground model after a period of time. Similarly, background and/or foreground models may be removed from the set of models for a scene. In this way, one or more time-evolving models may be generated and/or maintained. As discussed herein, time-evolving background and/or foreground models may be used to determine a likelihood or probability that a point in an image, for example a depth image, comprises an element in the relevant foreground of the image.

Figure 7B:
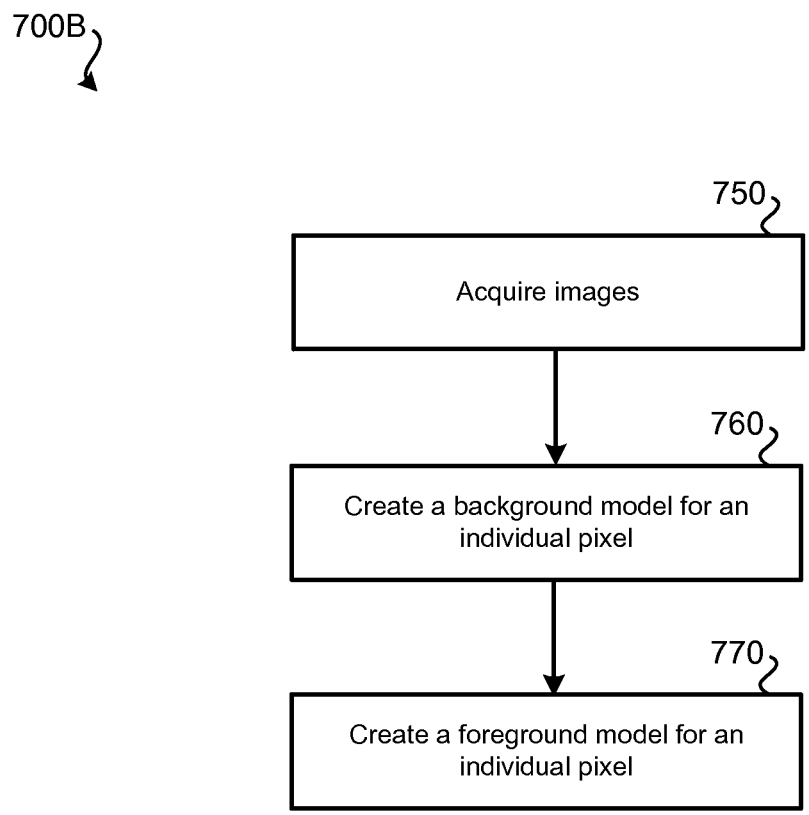
FIG. 7B illustrates an embodiment of a method for creating background and foreground models for individual pixels.

While method 600 focused on the creation of background models for individual pixels and method 700A focused on creating a foreground model for individual pixels, FIG. 7B illustrates an embodiment of a method 700B for creating both background and foreground models for pixels. Method 700B may be performed by a processing device, such as processing module 120 of FIG. 1. As such, means for performing method 700B may include one or more computer systems (which may include one or more processors). Means for performing method 700B may include components of system 100 of FIG. 1. More specifically, steps of method 700B may be performed by foreground modeling module 240, image acquisition module 210, depth segmentation module 220, and/or background/foreground extraction module 250 of system 200. As such, means for performing each step of method 700B may include system 200 and, more specifically, background modeling module 230 and foreground modeling module 240.

At step 750, images may be acquired. Each image may include a plurality of pixels, each pixel having an intensity value and a depth value. Referring to system 200 and system 100, each image may be acquired or received by image acquisition module 210 from image capture module 110, which may be a camera. Each image may be of the same scene. For example, the image capture module may be pointed at the contents of a room and configured to capture images over a period of time. The image capture module may be left stationary such that the scene in the image capture module's field-of-view does not substantially change. Means for performing step 750 may include one or more processors, an image acquisition module, an image capture module, and/or any of the means discussed generally in reference to method 700B.

A background model may be created at step 760 for a pixel. In one embodiment, if a particular pixel remains constant in intensity and/or depth, within a threshold range, for a threshold period of time across the images acquired during the period of time, a background model may be created at step 760 for the pixel. Whether a background model is created for a particular pixel may be irrespective of whether a background model was previously created for the pixel. The background model may be a Gaussian Mixture Model (GMM) having the form of $(D_i, I_i), (Var_{D_i}, Var_{I_i})$. $(D_i, I_i)$ may represent the observed constant depth and intensity of the pixel over the period of time. $(Var_{D_i}, Var_{I_i})$ may represent a predetermined amount of variance that is used for each pixel's background model(s) or may represent variances that are calculated based on slight variances in measured depth and measured intensity during the period of time when the pixel remained approximately constant. In some embodiments, a plurality of background models are created at step 760. At least one background model may be created for each pixel in the images in some embodiments. The background models may be indicative of the scene over the period of time. Means for performing step 760 may include one or more processors, a background modeling module, and/or any of the means discussed generally in reference to method 700. Step 760 may be performed for multiple pixels in the acquired images.

At step 770, a foreground model for a pixel may be created. In some embodiments, a plurality of foreground models are created using the images. A foreground model may created for each pixel of at least a first subset of the pixels in the images, and/or the foreground models may be indicative of the scene over the period of time. In some embodiments, for some or all pixels acquired at step 750, a voting array may be created (if one does not already exist) or the voting array may be modified (if a voting array already exists). As previously described in relation to equation 1, δ represents the depth resolution of the images and R represents the maximum depth range of depth values acquired at step 750. When a pixel is determined to be occupied by a person at a particular depth, the depth may receive a "vote" in the pixel's array at the array element corresponding to the depth. Over time, one or more local maximums may develop within a pixel's voting array (that is, one or more elements within the array that are greater in magnitude than other elements) and one or more local minimums may develop within the array (that is, one or more elements within the array that are smaller in magnitude than other elements). The width, in elements, of local maximums may be determined based on the location of adjacent local minimums. For each of the local maximums for a pixel, a Gaussian mixture model (GMM) may be generated for the pixel's feature vector, having the form $(D_i, I_i)$, $(Var_{Di}, Var_{Ii})$. This model may be used as the foreground model for the pixel. A pixel may be restricted to having one foreground model or may have multiple foreground models. Step 770 may be performed for multiple pixels in the acquired images.

In order to preserve processing power, the arrays for pixels may be populated while a person is present within images being acquired; however, the Gaussian mixture models for individual pixels for foreground models may only be computed by a foreground modeling module when no person is detected within the scene of acquired images in some embodiments. For example, step 750 may be being performed continuously, with 30 images per second being captured. For each (or some) of these acquired images, indications may be received by the foreground modeling module of which pixels correspond to a person in the scene. While such indications of pixels are being received, the voting arrays of individual pixels may be updated, but the Gaussian mixture models created using the arrays may not be calculated until pixels that indicate the presence of a person have not been received for a threshold period of time (e.g., one minute). Such an arrangement may prevent the foreground models for pixels from continually being calculated and potentially consuming excessive processing resources. Means for performing step 770 may include one or more processors, a foreground modeling module, and/or any of the means discussed generally in reference to method 700A and 700B.

It should be understood that in addition to the steps of the illustrated embodiment of method 700B, other embodiments of method 700B may include additional steps from method 600 of FIG. 6 and/or method 700A of FIG. 7A and/or may include other steps which are not illustrated.

Figure 8:
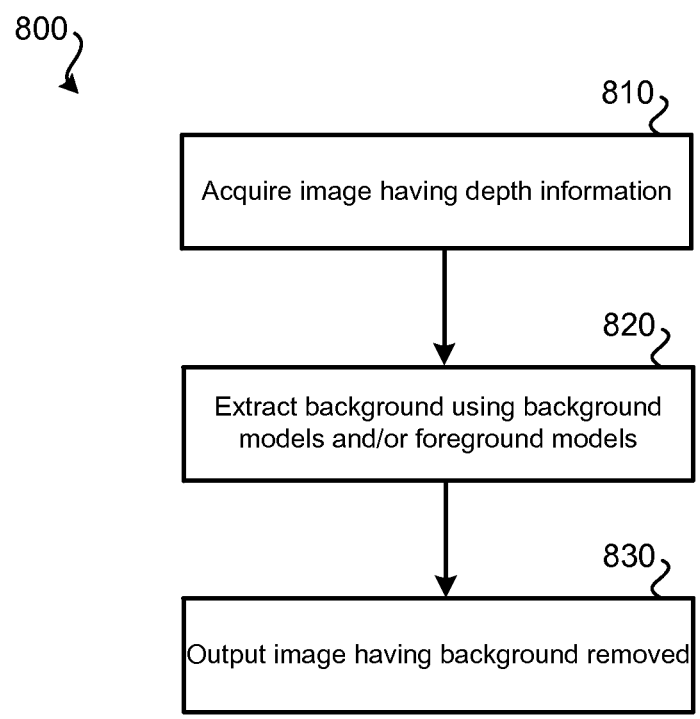
FIG. 8 illustrates an embodiment of a method for modeling a scene using background and/or foreground models.

FIG. 8 illustrates an embodiment of a method 800 for modeling a scene using a background and/or a foreground model. Method 800 may involve pixels of an image of a scene being extracted that are determined to correspond to the background (and are unlikely to correspond to a person). Method 800 may be performed by a processing device, such as processing module 120 of FIG. 1. As such, means for performing method 800 may include one or more computer systems (which may include one or more processors and computer-readable storage mediums). Means for performing method 800 may include components of system 100 of FIG. 1. More specifically, steps of method 800 may be performed by foreground modeling module 240, image acquisition module 210, depth segmentation module 220, and/or background/foreground extraction module 250 of system 200. As such, means for performing each step of method 800 may include the modules of system 200. When method 800 is performed, method 600 and/or method 700A or method 700B may have been previously performed for at least some pixels.

At step 810, images may be acquired. Each image may include a plurality of pixels, each pixel having an intensity value and a depth value. Referring to system 200 and system 100, each image may be acquired by image acquisition module 210 from image capture module 110, which may be a camera. Each image may be of the same scene. For example, the image capture module may be pointed at the contents of a room. The image capture module may be left stationary such that the scene in the image capture module's field-of-view does not substantially change. Means for performing step 810 may include one or more processors, an image acquisition module, an image capture module (e.g., a camera), and/or any of the means discussed generally in reference to method 800.

At step 820, each pixel of the image may be compared to one or more background models of the pixel (if available) and one or more foreground models of the pixel (if available). This process may be repeated for each pixel of the image. A pixel may be classified as either background, foreground, or uncertain. As part of step 820, a pixel may first be determined to be more likely matching a foreground or background model of the pixel. If a type of model for the pixel is not available, the probability of the missing model is taken as zero. Once it is determined if the pixel more likely matches a background model or a foreground model, the probability of a match to the determined model is compared to a threshold. If the probability exceeds the threshold, the pixel is considered to match the model, and if the probability does not exceed the threshold, the pixel is classified as uncertain. Means for performing step 820 may include one or more processors, one or more computer-readable storage mediums, a background/foreground extraction module, and/or any of the means discussed generally in reference to method 800.

At step 830, only pixels that are classified as foreground or uncertain may be output. The output may be to a depth segmentation module. Referring to system 200, background/foreground extraction module 250 may output the foreground and uncertain pixels to depth segmentation module 220. The pixels classified as background may be extracted such that they are not provided to depth segmentation module 220. Means for performing step 830 may include one or more processors, one or more computer-readable storage mediums, a background/foreground extraction module, a depth segmentation module, and/or any of the means discussed generally in reference to method 800. In some embodiments, the pixels that are classified as uncertain may not be output. Thus, in these embodiments, only pixels representative of likely foreground elements may be output.

Figure 9:
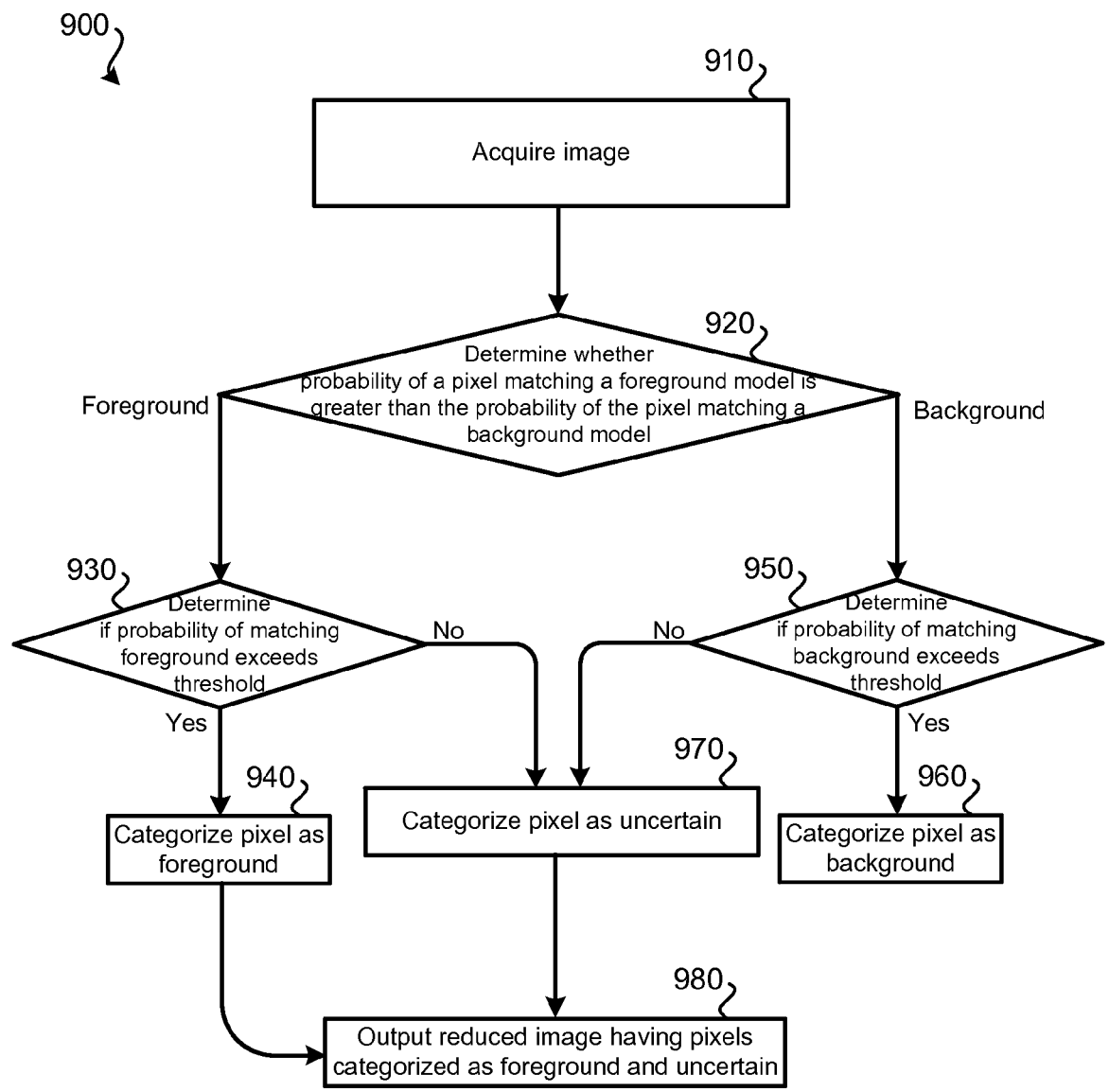
FIG. 9 illustrates another embodiment of a method for modeling a scene using background and/or foreground models.

FIG. 9 illustrates another embodiment of a method 900 for modeling a scene using a background and/or a foreground model. Method 900 may involve pixels of an image of a scene being extracted that are determined to correspond to the background and are unlikely to correspond to a person. Method 900 may be performed by a processing device, such as processing module 120 of FIG. 1. As such, means for performing method 900 may include one or more computer systems (which may include one or more processors and computer-readable storage mediums). Means for performing method 900 may include components of system 100 of FIG. 1. More specifically, steps of method 900 may be performed by image acquisition module 210, foreground modeling module 240, depth segmentation module 220, and/or background/foreground extraction module 250 of system 200. As such, means for performing each step of method 900 may include the modules of system 200. When method 900 is performed, method 600 and/or method 700A or method 700B may have been previously performed for at least some pixels. Method 900 may represent a more detailed embodiment of method 800.

At step 910, images may be acquired. Each image may include a plurality of pixels, each pixel having an intensity value and a depth value. Referring to system 200 and system 100, each image may be acquired by image acquisition module 210 from image capture module 110, which may be a camera. Each image may be of the same scene. For example, the image capture module may be pointed at the contents of a room. The image capture module may be left stationary such that the scene in the image capture module's field-of-view does not substantially change. Means for performing step 910 may include one or more processors, an image acquisition module, an image capture module (e.g., a camera), and/or any of the means discussed generally in reference to method 900. The image acquired at step 910 may also be provided to a background modeling module for creation of background models that correspond to pixels present across images.

At step 920, for a particular pixel of the image acquired at step 910, it is determined whether a probability of the pixel matching a foreground model (if available) for the pixel is greater than the probability of the pixel matching a background model (if available) for the pixel. Therefore, it may be determined whether $P_B > P_F$ or $P_B < P_F$, where $P_B$ is the probability that the pixel corresponds to the background model and $P_F$ is the probability that the pixel corresponds to the foreground model. If multiple types of a model are available, such as multiple background models, it may first be evaluated which background model is more likely a match for the pixel, then compare the probability of the pixel matching that background model with the probability of the pixel matching a foreground model. If a particular type of model is not available, the probability of matching that type of model may be taken as zero.

If, at step 920, a pixel is determined to more likely match an available foreground model of the pixel than a background model of the pixel (or no background model is available), method 900 proceeds to step 930. At step 930, the probability of the pixel matching the foreground model of the pixel is compared to a predefined threshold value (T). This threshold value may be preselected and may serve to determine how closely a pixel is required to match the foreground model for the pixel to be considered foreground. If $P_F$ exceeds T, the pixel may be categorized as foreground at step 940. If T exceeds $P_F$, the pixel may be categorized as uncertain at step 970.

If, at step 920, a pixel is determined to more likely match an available background model of the pixel than a foreground model of the pixel (or no foreground model is available), method 900 may proceed to step 950. At step 950, the probability of the pixel matching the background model of the pixel is compared to a predefined threshold value (T). This threshold value may be preselected and may serve to determine how closely a pixel is required to match the background model for the pixel to be considered background. The same threshold value may be used as at step 930, or a different predefined threshold value may be used. If $P_B$ exceeds T, the pixel may be categorized as background at step 960. If T exceeds $P_B$, the pixel may be categorized as uncertain at step 970. Although T is used to describe the threshold value to compare both $P_F$ and $P_B$ against, those of skill in the art will appreciate that $P_F$ and $P_B$ may be compared against different threshold values. In some embodiments, however, both $P_F$ and $P_B$ are compared against the same threshold value.

At step 980, if the pixel was categorized as either foreground or uncertain, the pixel may be output. The output may be provided to a depth segmentation module for detection of a person, if present, in the image. The output may or may not indicate whether the pixels output are foreground or are uncertain. If the pixel is categorized as background, the pixel is not output. Rather, the pixel is extracted such that it is not output to a depth segmentation module. Steps 920 through 970 may be repeated for each pixel of the image acquired at step 910, such that an image is output at step 980. As such, at step 980, a reduced image may be output that contains fewer pixels than the image acquired at step 910. The image output may contain only foreground and uncertain pixels, thus static objects in the background of the acquired image may have been removed. Referring to FIG. 3 and FIG. 5, image 300 of FIG. 3 may represent the image acquired at step 910, while image 500 may represent the image output at step 980 with pixels identified as background extracted. The image output at step 980 may contain an indication of which pixels are foreground. This may be useful to limit the search for a control object or input, or to allow these pixels to be provided a higher priority when searching for a person in the output image than the uncertain pixels. In some embodiments, the pixels that are classified as uncertain may not be output at step 980. Thus, in these embodiments, only pixels representative of likely foreground elements may be output in step 980.

FIGS. 5 through 9 were directed to the use of background and foreground models to determine whether individual pixels were likely part of the background (and thus did not need to be further analyzed), part of the foreground, or uncertain (with foreground and uncertain pixels being additionally analyzed). FIGS. 10 through 18 are directed to analyzing the image remaining after the background pixels have been removed, and identifying the locations of one or more hands of one or more persons present within the image. While the embodiments of FIGS. 10 through 15B are directed to images in which one hand of one person is detected and tracked, it should be understood that the embodiments detailed herein may be applied to situations where the image contains multiple persons and/or multiple hands. Certain of those embodiments are explicitly described herein, while other embodiments will be apparent to those of skill in the art based on the materials herein.

Figure 10A:
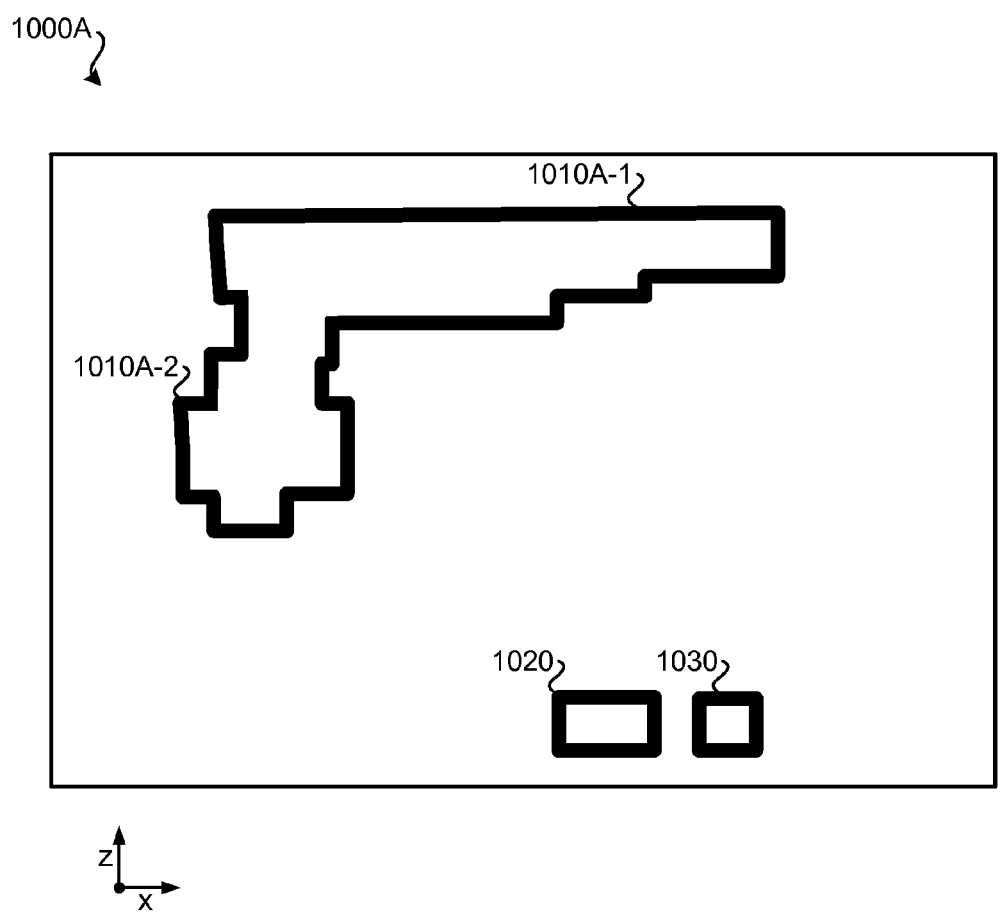
FIG. 10A illustrates an embodiment of a depth segmented image wherein a person's hand does not occlude at least a portion of the person's arm.

FIG. 10A illustrates an embodiment of a depth segmented image 1000A. Depth segmented image 1000A may provide a top-view of image 500 based on the depth data present for the pixels of image 500. Image 500 does not contain pixels that were identified by a background/foreground extraction module (such as background/foreground extraction module 250 of FIG. 2) as background. As such, depth segmented image 1000A may include pixels that were classified as foreground or uncertain. Referring to system 200 of FIG. 2, depth segmented image 1000A may be created by depth segmentation module 220 using the image output by background/foreground extraction module 250 that has background pixels removed (or has background pixels designated as background).

Ideally, just pixels corresponding to a person would be classified as foreground or uncertain. However, objects in a scene may be moved or added to the scene, such as by the person. Since the background is based on the depth value and/or intensity value of a pixel remaining unchanged for a significant period of time (e.g., several hours), objects (or entities, such as pets) that have recently entered the scene may cause pixels not associated with a person to be classified as uncertain or foreground. Accordingly, further processing may be used to determine which foreground and/or uncertain pixels correspond to a person. In image 500, three entities are present that are associated with pixels that were identified as uncertain or foreground: person 330, mug 350, and small object 360. While person 330 is sitting on a couch (as can be seen in the initially received image 300 of FIG. 3), mug 350 and small object 360 are located on a coffee table positioned in front of the couch. As such, the depth values associated with mug 350 and small object 360 can be expected to indicate a smaller distance to the image capture device (e.g., camera). In FIG. 10A, three groups of pixels are present: pixel group 1010A, pixel group 1020, and pixel group 1030. Pixel group 1010A corresponds to person 330, pixel group 1020 corresponds to mug 350, and pixel group 1030 corresponds to small object 360.

Due to mug 350 being a distance in front of person 330, pixel group 1020 is a separate pixel group and is in front of pixel group 1010A. Similarly, due to small object 360 being a distance in front of person 330, pixel group 1030 is a separate pixel group and is in front of pixel group 1010A. Pixel group 1020 and pixel group 1030 may have approximately the same depth values because they are approximately equidistant from the image capture device. Accordingly, from image 500, three distinct groups of pixels can be identified based on depth. The process of identifying these distinct groups of pixels may be referred to as a depth segmentation process. At least some of these pixel groups may be dismissed as not being a person based on size. For instance, pixel groups that are too small or too large may be dismissed as not likely to correspond to a person. Accordingly, a minimum size threshold (and/or a maximum size threshold) for groups of pixels may be predefined and may be stored or may be accessible by the device or component performing the depth segmentation process.

Each group of pixels identified during a depth segmentation process may be analyzed to determine if it qualifies within minimum and/or maximum size threshold constraints. Referring to image 1000A, pixel groups 1010A, 1020, and 1030 may each be analyzed. It should be understood that various pixels of pixels groups 1010A, 1020, and 1030 may not be visible in FIG. 10A because pixels with the same x-axis coordinate and z-axis depth value would appear on top of each other in the top view of FIG. 10A. Determining whether a group of pixels qualifies within minimum and/or maximum size threshold constraints may include using pixels that are part of the pixel groups not visible in FIG. 10A.

Pixel group 1020, corresponding to mug 350, may not exceed a minimum predefined threshold size. The size of a pixel group may be based on the number of pixels within the pixel group. Based on the number of pixels in pixel group 1020, mug 350 may be dismissed as unlikely to correspond to a person. Similarly, based on the number of pixels in pixel group 1030, small object 360 may be dismissed as unlikely to correspond to a person. No additional processing may be performed on pixel groups 1020 and 1030 and these pixel groups may be ignored from further processing or deleted from an image constructed from the pixels.

Pixel group 1010A, which includes pixel group 1010A-1 (the person's torso and head) that is connected with pixel group 1010A-2 (the person's hand) via the person's arm may exceed the minimum predefined size threshold (and may meet other qualifications, such as being less than a maximum predefined size threshold). Accordingly, pixel group 1010A may be considered eligible to correspond to a person. While pixel groups 1020 and 1030 were eliminated based on threshold size conditions, pixel group 1010A may be maintained as a candidate group for corresponding to a person based on the threshold conditions. While not illustrated in FIG. 10A, a plurality of pixel groups may be maintained, for example when multiple people are present in the image or multiple items that are sized similar to a person are present.

In some embodiments, additionally or alternatively to minimum and/or maximum size threshold conditions, dimensions of pixel groups along the x-axis, y-axis, and/or z-axis may be used to disqualify pixel groups as potentially corresponding to a person. In some embodiments, a minimum and/or maximum distance from the image capture device may be used to disqualify pixel groups. For instance, if a group of pixels is identified as being beyond a maximum threshold distance from the image capture device, it may be considered unlikely that the entity the group of pixels corresponds to a person likely attempting to interact with the detection system; as such, such pixel groups may be disqualified. Similarly, if a group of pixels is identified as closer than a minimum threshold distance from the image capture device, the group of pixels may be disqualified because a person may be unlikely to be positioned so close to the image capture device. For example, a person may be likely to be sitting on a couch, but not standing immediately in front of the image capture device. It should be understood that variations on these thresholds may be implemented; such as if a portion of a group of pixels exceeds the minimum or maximum threshold, the group of pixels may be disqualified. One or more thresholds may be user-defined. For example, if a user knows his couch is 10 feet from the television and the user always sits on his couch when using the television, the user may set a minimum threshold of 8 feet such that a person walking in from the couch is disqualified and cannot provide input. Continuing with the same example, the user may want to specify a maximum distance of 12 feet, such that a person walking in the same room behind the couch is disqualified and cannot provide input. In some embodiments, one or more thresholds are learned, for example based on data acquired over time, or one or more thresholds could be set based on an initial configuration, for example based on an image captured of an empty room during a calibration procedure.

Figure 10B:
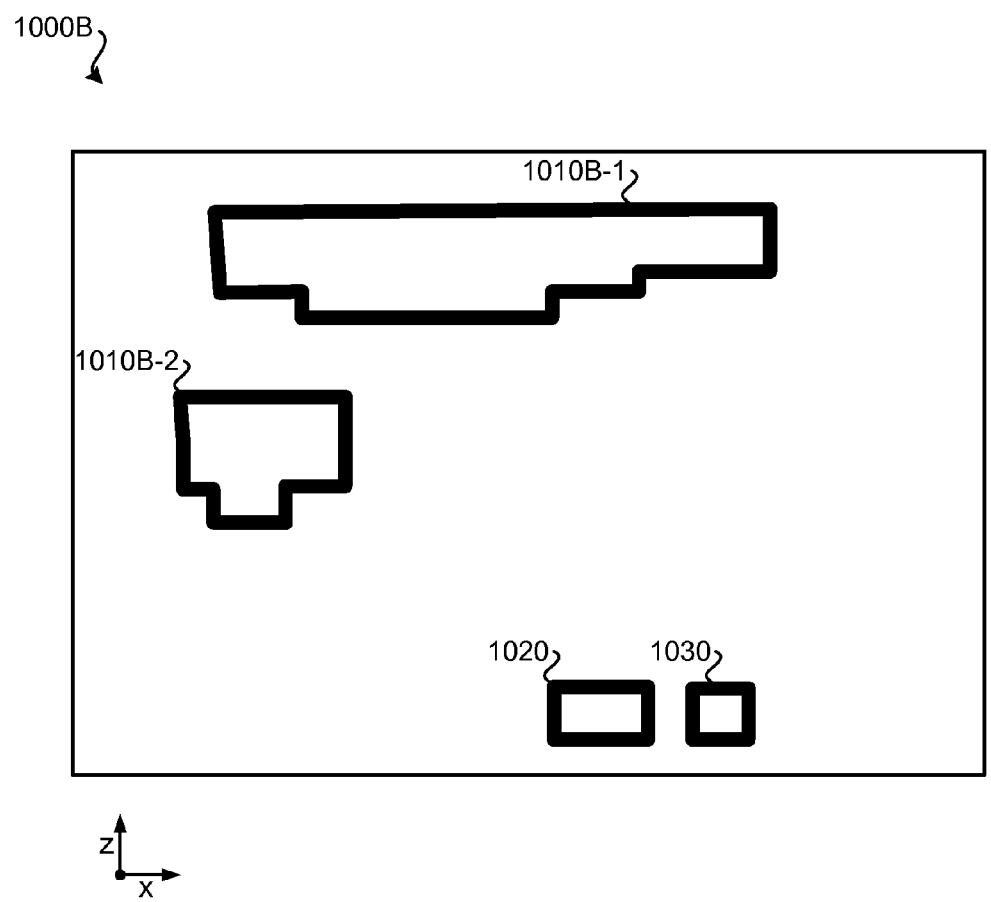
FIG. 10B illustrates an embodiment of a depth segmented image wherein a person's hand occludes at least a portion of the person's arm.

When a person's hand is held in front of the person's body, such as to perform a gesture, the person's hand may occlude some or all of the person's arm. Accordingly, the person's hand may appear as a separate pixel group from the person's head, shoulders, and torso. FIG. 10B illustrates an embodiment of a depth segmented image 1000B wherein a person's hand occludes at least a portion of the person's arm resulting in the person being associated with two pixel groups: pixel group 1010B-1 and pixel group 1010B-2. Image 1000B may also represent a top-view of image 500 using the depth data present in the pixels of image 500 similar to image 1000A, except that at least a portion of the person's arm is occluded from the image capture device by the person's hand.

In order to reduce or eliminate the occurrences of a person's extended hand occluding the person's arm in a captured image (and showing that the person's hand is connected with the person's body), the image capture device (e.g., camera) may be placed at an angle to the scene such that a person present in the scene will be less likely to occlude the person's arm with their hand while performing a gesture. For example, if a person typically sits on a couch facing a television, the image capture device may be above the television and/or off to a side of the television, such that a gesture made by the person in the direction of the television is less likely to occlude the person's arm from the image capture device.

In some embodiments, a history of pixel groups from previous images may be used to determine if separate pixel groups should be treated as part of a single pixel group (referred to as a compound pixel group) because the pixels groups likely correspond to the same object. Referring to FIG. 10B, pixel group 1010B-2 corresponds to a person's hand and is a separate pixel group from pixel group 1010B-1, which corresponds to the person's shoulder's head, and torso. FIG. 10B may represent a depth segmentation image created some time after the depth segmentation image of FIG. 10A. In FIG. 10A, pixel group 1010A is a single pixel group, because the person's arm is not occluded from the image capture device. However, in FIG. 10B, the person's arm has become occluded by the person's hand. Based on a stored history of pixel groups, it may be determined that both pixel group 1010B-2 and pixel group 1010B-1 should be treated as a compound pixel group corresponding to the same pixel group because these pixel groups were previously determined to be part of a single pixel group (e.g., pixel group 1010A of FIG. 10A). Determining two or more pixel groups should be treated as a compound pixel group may be based on location, size, shape and/or movement of the pixel groups. Distance may also be used to determine if two or more pixel groups should be treated as a compound pixel group. For example, a second pixel group close to a first pixel group of a user may be likely to be part of the user. A pixel group directly in front of a pixel group associated with a user may be considered likely to represent part of the user.

Figure 11:
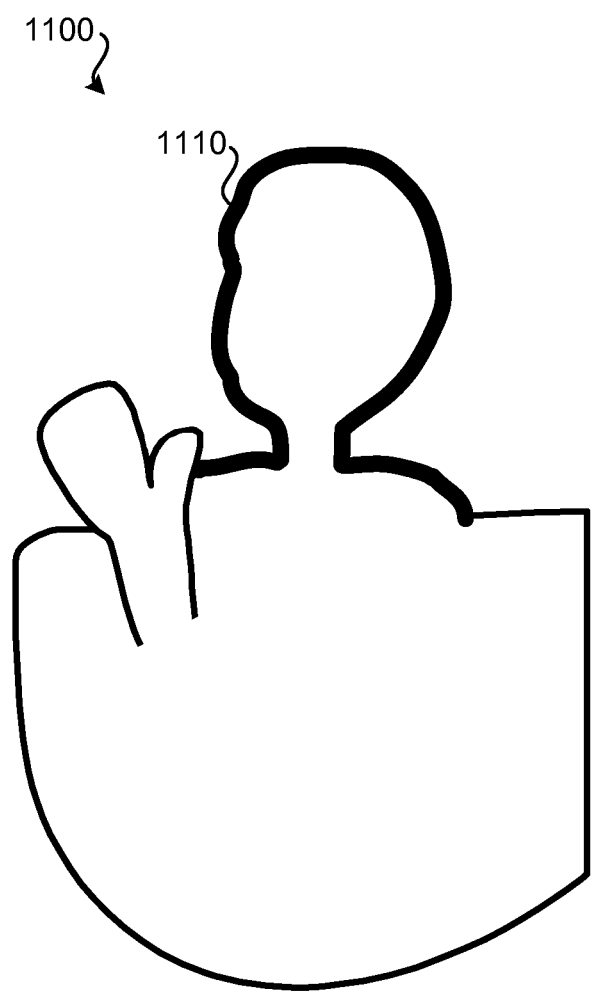
FIG. 11 illustrates an embodiment of an image following depth segmentation.

Following the size threshold analysis, only pixel group 1010A or pixel groups 1010B-1 and 1010B-2, which may be treated as a compound pixel group, may remain for analysis. FIG. 11 illustrates an embodiment of image 1100, which represents only pixel group 1010A. As such, image 1100 represents image 500 of FIG. 5 with the pixel groups corresponding to mug 350 (pixel group 1020) and small object 360 (pixel group 1030) removed. The only pixels present in FIG. 11 are the pixels corresponding to pixel group 1010A. It should be understood that in other embodiments more than one pixel group may qualify under a threshold analysis (e.g., an image of scene with multiple people present). As such, an image created based on the qualifying pixel groups may contain multiple entities.

For each pixel group present in image 1100, a principal component analysis (PCA) may be conducted. In the illustrated embodiment, since only one pixel group is present, the PCA may only be performed once. A PCA may involve the use of a set of training observations to determine if a pixel group likely corresponds to a person. Previously, a large number (e.g., tens, hundreds, thousands, etc.) of images of people's upper bodies may be captured. Each such sample may be converted into a binary silhouette, and normalized in a fixed direction. These samples may include samples in which the upper body (e.g., head and shoulders) of the persons are rotated along the x-axis, y-axis, and/or z-axis. This may be useful because a person in the scene may not have their head and shoulders directly facing the image capture device, such as a person laying a couch or sitting or standing at an angle to the image capture device. Based on the samples, a PCA is conducted to compute the covariance matrix of all the samples. The model created may consist of the N largest eigen vectors of the covariance matrix. In some embodiments, the 7 largest vectors (also referred to as principal components) may be used for the PCA of pixel groups in an image being analyzed. Accordingly, the principal components may be predetermined and may be stored onto the system performing the analysis. It should be understood that greater or fewer vectors may also be used for the model. The principal components may be used in conducting a PCA on each remaining pixel group to determine if a pixel group likely corresponds to a person. Besides conducting a PCA, other techniques may be used, such as a Kullback-Leibler divergence (KLD).

Pixel groups on which a PCA is conducted that are determined to not contain a head and shoulders may be disqualified as a candidate for corresponding to a person. Referring to FIG. 11, a PCA of the pixel group in image 1100 is analyzed using the predetermined principal components. The pixel group of image 1100 qualifies because a head and shoulder combination is detected using the PCA, as highlighted by head/shoulder 1110. At this point, it has been determined that each pixel of the pixel group of image 1100 corresponds to a person. Accordingly, an indication of each pixel, which may include the pixel's depth and/or intensity value, may be output to a foreground modeling module. Referring to FIG. 2, depth segmentation module 220 may output an indication of each pixel of the pixel group of image 1100 to foreground modeling module 240. This may occur for each image in which a group of pixels is determined to correspond to a person according to a head and shoulders PCA. As previously detailed in this document, foreground modeling module 240 may use the pixels provided by depth segmentation module 220 to create foreground models for individual pixels, which are provided to background/foreground extraction module 250.

For each group of pixels that is determined to correspond to a person (such as following a PCA), such as groups of pixels that have been identified as corresponding to a person, a plane may be fit to the group of pixels. This plane may be used, as detailed later in this document, for determining the location of a hand of the person corresponding to the group of pixels. Referring to FIG. 11, a plane may be fit to the group of pixels in image 1100. This plane may be aligned with the torso, shoulders, and head of the group of pixels corresponding to the person. As illustrated in FIG. 11, the group of pixels may be associated with a person that is extending his or her hand, such as to perform a gesture. If the average depth of pixels within the group of pixels is used to position the plane, the extension of the person's hand may influence the position of the plane away from the person's torso, shoulders, and head.

To position the plane while limiting the effect of a possible extended hand and arm (as is present in image 1100), a plane may initially be fit to the entire group of pixels. This plane may be orientated in three dimensional space. For instance, as a simple example, a person sitting may slouch, thus, along the y-axis the plane may extend away from the image capture device. As another example, a person sitting or standing at an angle to the image capture device may result in the plane not being parallel to the x-axis. To determine the initial position of the plane, the x, y, and z (depth) coordinates of the pixels of the pixel group may be used.

The plane may be fit to the group of pixels to initially minimize a total amount of fitting error for the pixels of the group of pixels. The fitting error for a pixel is a function of the distance of the three dimensional point associated with the pixel to the plane.

The position of the plane may then be refined. Based on a factor such as the mean amount of fitting error for all the pixels of the pixel group, a threshold fitting error value may be calculated. Since the initial location and/or orientation of the plane may be affected by an outstretched hand and arm, the plane may be located in front of the person's torso, head, and shoulders. However, since the person's hand is smaller than the torso, head, and shoulders (combined), it may be assumed the plane will be closer to the person's torso, head, and shoulders than the person's hand. Accordingly, pixels with a fitting error greater than a threshold fitting error value may be eliminated from use in determining a refined position and orientation of the plane. Since the person's hand and arm likely correspond to at least some of the pixels with farther coordinates from the plane, some or all of these pixels will likely be eliminated from use in calculating the refined position of the plane. The location and orientation of the plane may then be recalculated and best fit to the coordinates of the pixels that were not eliminated. This new position/orientation of the plane may be used as the final position of the plane, or the process may be repeated additional times (with additional pixels being eliminated) to further refine the position and/or orientation of the plane. In some embodiments, only the initial estimate of the plane position and/or orientation is used.

Figure 12:
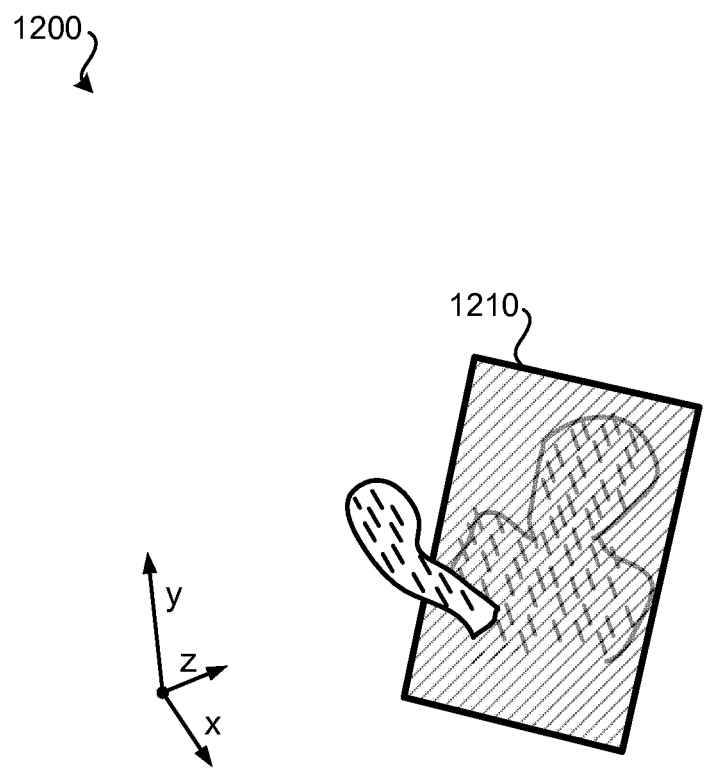
FIG. 12 illustrates an embodiment of a plane fit to an image of a person.

FIG. 12 illustrates an embodiment of an image 1200 having a plane 1210 fit to the coordinates of pixels of a group of pixels. Image 1200 may represent a point cloud representation of the pixels of image 1100 of FIG. 11 with plane 1210 fit to the pixel group. As such, the coordinates of the pixels may correspond to pixels that have previously been determined to correspond to a person via a PCA. Plane 1210 has been fit to the coordinates of the pixels as detailed above. In FIG. 12, it can be seen that the person's hand extends in front of the person's body. The plane may be initially fit to the person's torso, head, hand, and arm, then following refinement of the position and/or orientation of the plane, the pixel coordinates associated with some or all of the person's hand and/or arm may be eliminated from use in determining the position and/or orientation of the plane, as detailed above. The position and/or orientation of the plane may be stored by a system, for example in a memory of the system 100 and/or 200. Referring to system 200 of FIG. 2, the fitting of the plane may be performed by depth segmentation module 220.

Following a PCA being used to determine a group of pixels corresponds to a person and a plane being fit to the group of pixels, a location of a hand of the person may be determined. Referring to FIG. 2, determination of the location of the hand may be performed by hand detection/tracking module 260. Depth segmentation module 220 may pass data to hand detection/tracking module 260, including: an indication of one or more planes and/or pixels corresponding to the pixel groups determined to correspond to person(s). Hand detection/tracking module 260 may use these inputs to output two-dimensional and/or three-dimensional coordinates of one or more hand locations. Such coordinates may be output for each image received by image acquisition module 210 in which at least one person (and a hand of the person) is identified.

Hand detection/tracking module 260 may analyze the one or more pixel groups received from depth segmentation module 220. A reference point for each pixel group may be established. This reference point may be the "center-of-gravity" of the pixel group. As such, an average coordinate may be calculated based on the x, y, and z coordinates of each pixel of the pixel group. Once the location of a hand has been determined, another technique may be employed for tracking the hand. In some embodiments, hand detection/tracking module 260 may repeat the detection process in order to track the position of the hand. Coordinates output for the hand position over a period of time may be used to determine if the hand has performed a gesture, such as a swipe, circle, etc.

Figure 13:
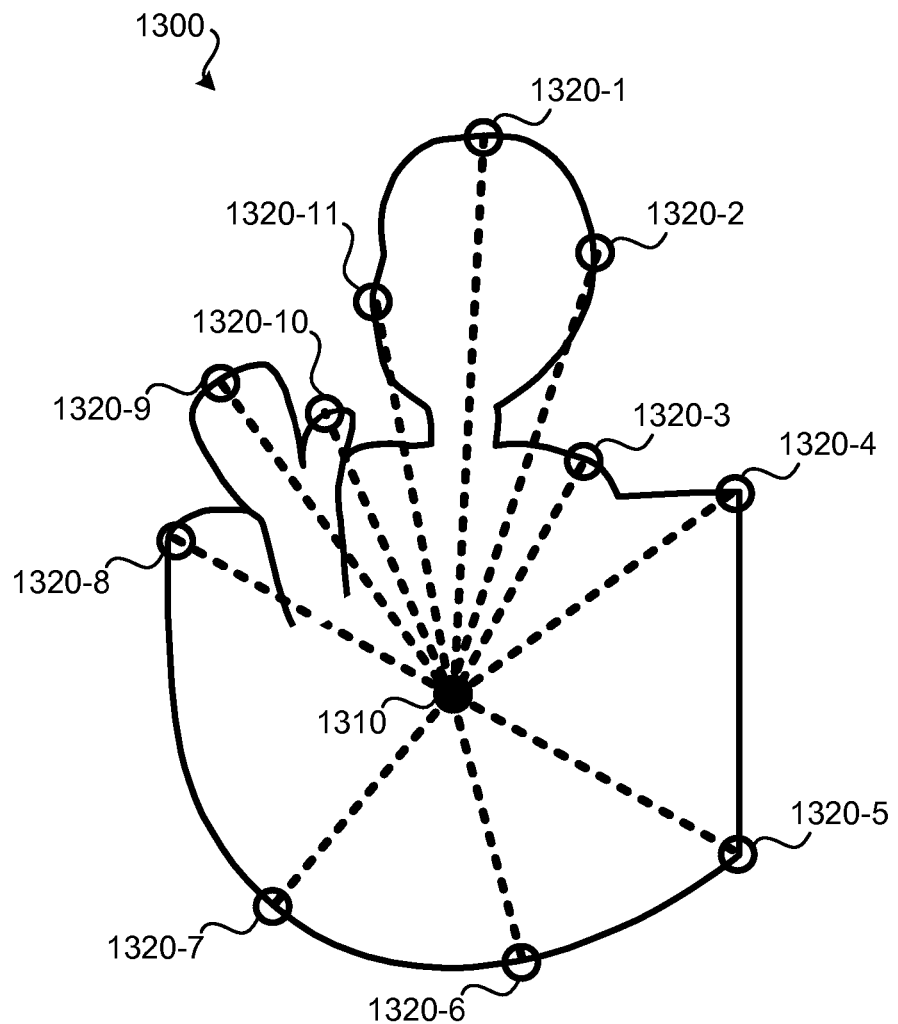
FIG. 13 illustrates an embodiment of an image with a calculated center-of-gravity and local distance maximums.

Next, a number of pixels that are local distance maximums from the reference point within each group of pixels may be determined. FIG. 13 illustrates an embodiment of an image 1300 illustrating a center-of-gravity 1310 and local distance maximum pixels 1320 with respect to image 1100. A local distance maximum pixel may be a pixel that, based on its coordinates, is farther from the center of gravity based on the pixel's three-dimensional coordinates than the pixel's neighbors that are also part of the pixel group. In the illustrated embodiment of FIG. 13, at least some local distance maximums of local distance maximum pixels 1320 are illustrated from center-of-gravity 1310. Each local distance maximum pixel 1320 is illustrated in combination with an imaginary dotted line from center-of-gravity 1310 to show the distance from center-of-gravity 1310. Each of local distance maximum pixels 1320 may be treated as a candidate for representing the person's hand. Distance may be calculated based on the three dimensional coordinates of a pixel and the center-of-gravity 1310.

As can be seen in FIG. 13, all but two of local distance maximum pixels 1320 do not represent a hand location. As such, ideally, each of these local distance maximum pixels that do not correspond to the person's hand location are eliminated as candidates and ignored from additional processing. In order to determine which local distance maximum pixels of local distance maximum pixels 1320 should be ignored, the previously defined plane 1210 of FIG. 12 may be used. As previously noted, plane 1210 is expected to be at least approximately aligned with the head, shoulders, and torso of the person. The local distance maximum pixels of local distance maximum pixels 1320 within a threshold distance of plane 1210 may be ignored from being considered as candidates for being a hand. In some embodiments, pixels behind the plane may be ignored. These local distance maximum pixels are likely due to the person's shoulders, head, and torso; not a hand of the person. Referring to the plane of FIG. 12 and local distance maximum pixels 1320 of FIG. 13, multiple local distance maximum pixels are likely within the threshold distance of the plane and can be eliminated as potential candidates for being a hand, including: local distance maximum pixel 1320-1, local distance maximum pixel 1320-2, local distance maximum pixel 1320-3, local distance maximum pixel 1320-4, local distance maximum pixel 1320-5, local distance maximum pixel 1320-6, local distance maximum pixel 1320-7, local distance maximum pixel 1320-8, and local distance maximum pixel 1320-11. Each of these local distance maximums pixels correspond to the head of the person, shoulders of the person, torso of the person, or possibly a portion of the couch deformed by the person sitting down. Image 1300 of FIG. 13 may include depth information. As such, local distance maximum pixels 1320 may be in three dimensions. Accordingly, local distance maximum pixels 1320-9 and 1320-10 may extend away from the plane a distance along the z-axis.

If a person is performing a gesture, the person's hand is likely extended a distance in front of the person, and thus would be a greater distance from the plane than the person's head, shoulders, or parts of the person's torso, as illustrated by the person's hand corresponding to local distance maximum pixels 1320-9 and 1320-10. The threshold distance from the plane that is used to determine whether a local distance maximum pixel should be dismissed as a candidate for corresponding to a hand may be predefined. Following this application of the plane, at least some of the local distance maximum pixels may be dismissed as candidates for representing a hand of the person.

For the remaining candidates, such as local distance maximum pixels 1320-9 and 1320-10, a region growing analysis may be conducted. To do this, a window (e.g., a number of pixels in each direction) around each remaining candidate local distance maximum pixel may be analyzed. Within the window, a depth variation for each pixel in comparison to its neighboring pixels may be calculated. A pixel within the window that has a small (e.g., the smallest) depth variation from other pixels within the window or its direct neighbors may be designated as a seed pixel. As such, a single seed pixel may be designated within a window around each remaining candidate local distance maximum. The seed pixel may be required to be part of the pixel group.

From a seed pixel selected for each remaining local distance maximum pixel, a region growing analysis may be conducted. Pixels bordering the seed pixel may be analyzed on the basis of depth. If a pixel bordering the seed pixel are within a depth threshold of the seed pixel's depth (either closer or farther from the image capture device), this pixel may be added to a pixel "blob" associated with the seed pixel. Pixels that border the pixel added to the blob may in turn be analyzed according to the depth threshold of the seed pixel's depth to determine if these pixels should be added to the pixel blob. If a pixel is outside the depth threshold based on the seed pixel, this pixel may not be added to the pixel blob and its neighboring pixels may not be analyzed. Rather than initially only comparing the depth of directly neighboring pixels to the seed pixel, a grid-based neighborhood of the seed pixel may be used, such as pixels in a five-by-five grid around the seed pixel.

The pixel blob may continue to be grown until either a maximum permitted size of the blob (e.g., a maximum number of pixels) is reached or the blob is completely surrounded by a depth discontinuity that exceeds the depth threshold established based on the seed pixel. Such a pixel blob may be created using a seed pixel for each local distance maximum pixel that was not previously eliminated as a candidate for being a person's hand. After a pixel blob has been grown, the pixel blob may contain multiple local distance maximum pixels. For instance, referring to FIG. 13, a blob grown based on local distance maximum pixels 1320-9 may also contain local distance maximum pixel 1320-10. In such instances, a single blob may be used for multiple local distance maximums pixels. This may be especially useful if multiple local distance maximum pixels represent multiple fingers of a person's hand.

Referring to FIG. 13, at this point a single pixel blob is present that contains local distance maximum pixels 1320-9 and 1320-10. This pixel blob is then analyzed to determine if it is likely to represent a person's hand. In other embodiments, if multiple pixel blobs were created based on local distance maximum pixels, each of these pixel blobs may be analyzed to determine if they are likely to represent a hand. Analysis of determining whether a pixel blob based on a local distance maximum likely represents a hand is detailed in accordance with method 17 of FIG. 17.

Figure 14:
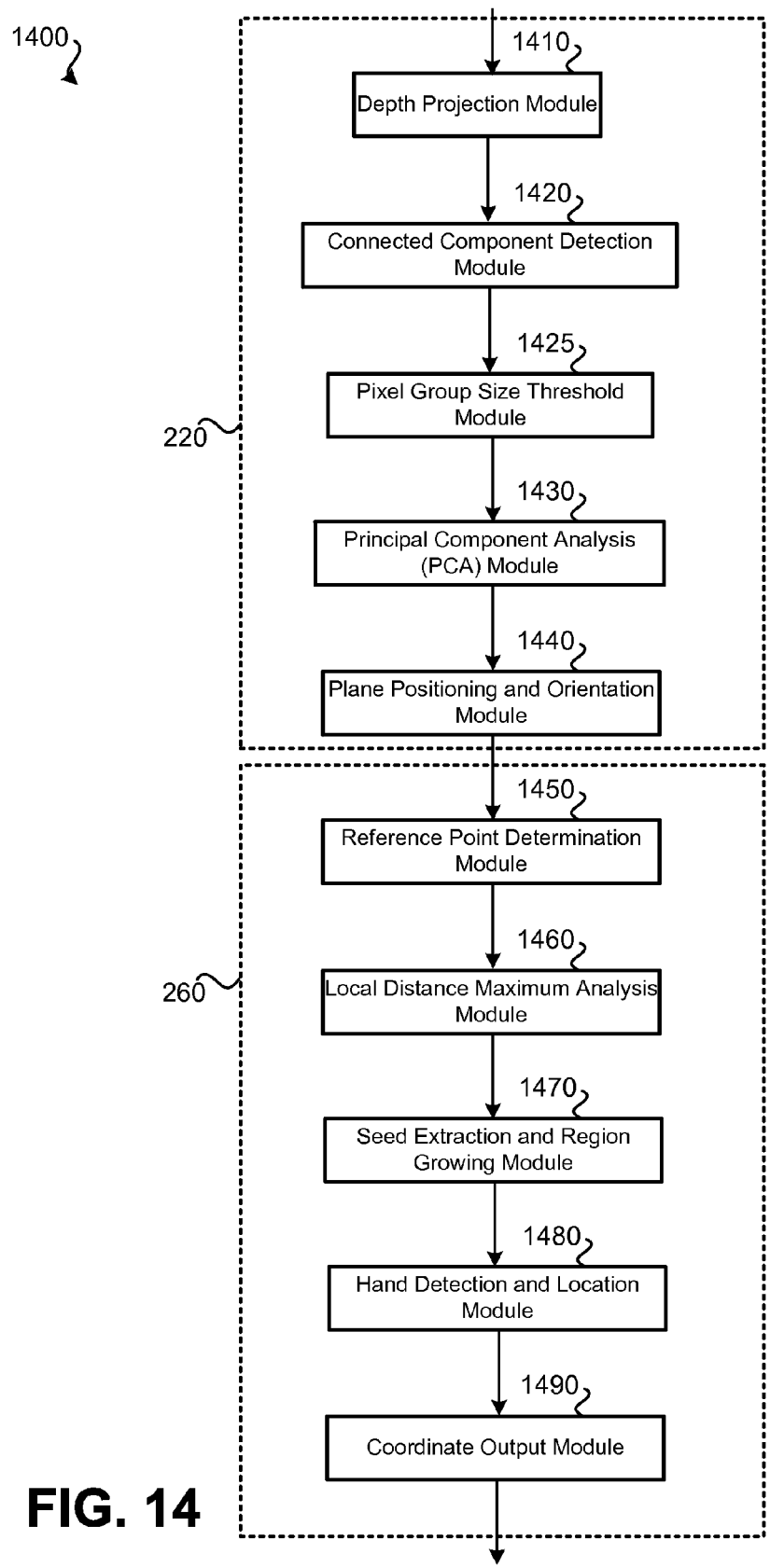
FIG. 14 illustrates an embodiment of a system that performs depth segmentation and hand detection/tracking functions.

In system 200 of FIG. 2, depth segmentation module 220 receives an image that may have one or more pixels removed that were determined to be background. Depth segmentation module 220 and hand detection/tracking module 260 may include multiple components that may include software, hardware, and/or firmware. FIG. 14 illustrates an embodiment of a system 1400 that performs depth segmentation and hand detection/tracking functions. System 1400 may represent a more detailed embodiment of depth segmentation module 220 and hand detection/tracking module 260. It should be understood that in other embodiments the modules of system 200 and system 1400 may be divided and/or combined differently.

System 1400 may include: depth projection module 1410, connected component detection module 1420, principal component analysis (PCA) module 1430, plane positioning and orientation module 1440, reference point determination module 1450, local distance maximum analysis module 1460, seed extraction and region growing module 1470, and hand detection and location module 1480. It should be understood that these modules may be combined into fewer modules or divided in a greater number of modules in other embodiments. Further, the distinction between which modules are considered part of depth segmentation module 220 and which modules are considered part of the hand detection/tracking module 260 may be arbitrary. Each module may be implemented using software, firmware, and/or hardware. For example, the functions of each module may be implemented using a computerized device. An exemplary computer system 1900 is presented in FIG. 19.

Depth projection module 1410 of depth segmentation module 220 may receive an image from background/foreground extraction module 250. This received image may have one or more pixels removed that were determined by background/foreground extraction module 250 to correspond to the background of a scene. If background models are available for a significant number of pixels, a large percentage of pixels of the image may be classified as background and ignored from further processing by system 1400. Each pixel present in the image received by depth projection module 1410 may have been categorized by background/foreground extraction module 250 as either a foreground pixel or an uncertain pixel. Depth projection module 1410, using the depth information associated with each pixel present, may identify various pixel groups that are likely to correspond to a particular object.

If the image capture device that captured the image has its view partially occluded, an object may correspond to multiple pixel groups by depth projection module 1410. Connected component detection module 1420 may be used to determine that separate pixel groups identified by depth projection module 1410 should be considered part of the same pixel group (called a compound pixel group). A common situation where this may occur is if a person's hand is extended generally toward the image capture device, occluding at least a portion of the person's arm, such that the depth projection module 1410 identified separate pixel groups for the person's hand and the person's head, shoulders, and/or torso. Connected component detection module 1420 may determine if multiple pixel groups identified by depth projection module 1410 should be treated as a compound pixel group based on a history of pixel groups maintained from previous captured images. For example, referring to FIG. 10A, pixel group 1010A is detected as a single pixel group because the person's arm is not fully occluded from the image capture device. If image 1000B of FIG. 10B was captured at a later time, pixels groups 1010B-1 and 1010B-2 may be considered to be part of a compound pixel group because pixel groups 1010B-1 and 1010B-2 are similar to pixel group 1010A based on time (e.g., within a certain number of captured images), location (e.g., similar coordinates), depth, size, and/or shape.

For each pixel group (including compound pixel groups), a threshold size analysis may be performed to determine if the pixel group is greater than a minimum size threshold and/or smaller than a maximum size threshold by pixel group size threshold module 1425. Pixel groups that do not meet the threshold size qualifications may be discarded from further analysis by pixel group size threshold module 1425. Other pixel groups may be passed to PCA module 1430.

PCA module 1430 may perform a PCA on each pixel group to identify pixel groups that include a head and shoulders. Only pixel groups (and compound pixel groups) that are determined to contain a head and shoulders may be passed to plane positioning and orientation module 1440. Besides a PCA being performed, some other technique may be used to determine if a pixel group likely corresponds to a person.

Plane positioning and orientation module 1440 may fit a plane to each pixel group (and compound pixel group) received by plane positioning and orientation module 1440. A plane may be positioned and oriented based on the location and depth of each pixel of a pixel group. The plane may be fit to the group of pixels to initially minimize a total amount of fitting error of the pixels of the group of pixels. The fitting error for a pixel is a function of the shortest distance from the plane to the three dimensional coordinate of the pixel.

The position of the plane may then be refined. Based on a factor such as the mean amount of fitting error for all the pixels of the pixel group, a threshold fitting error value may be calculated. Since the initial location and/or orientation of the plane may be affected by an outstretched hand and arm, the plane may be located in front of the person's torso, head, and shoulders. However, since the person's hand is smaller than the torso, head, and shoulders (combined), it can be assumed the plane may be closer to the person's torso, head, and shoulders than the person's hand, because the person's hand will have less of an effect on the fitting error due to its size compared to the person's head, shoulders, and torso. Pixels with a fitting error greater than a threshold fitting error value may be eliminated from use in determining a refined position and orientation of the plane. Since the person's hand and arm likely correspond to at least some of the pixels with coordinates from the plane outside the threshold, these pixels will likely be eliminated from use in calculating a refined position of the plane. The location and orientation of the plane may then be recalculated and best fit to the coordinates of the pixels that were not eliminated. This new position of the plane may be used as the final position of the plane. This process may be repeated additional times by plane positioning and orientation module 1440 to further refine the location of the plane.

Once a plane has been positioned for each pixel group (and compound pixel group), reference point determination module 1450 may be used to determine a reference point for the group of pixels. This may represent the center point of the group of pixels in three-dimensional coordinates, referred to as a center-of-gravity.

Local distance maximum analysis module 1460 may identify pixels within the pixel group (or compound pixel group) that represents a local distance maximum from the determined reference point. Each of these local distance maximum pixels may be used as a candidate for representing a person's hand. For a pixel to be a local distance maximum, the pixel may be farther away from the reference point than neighboring pixels within the pixel group. The distances between pixels and the reference point may be determined in three dimensions. Local distance maximum analysis module 1460 may also dismiss certain local distance maximum pixels from being candidates for a corresponding hand based on proximity to the plane or location behind the plane with respect to the image capture device. The plan's orientation and location may have been previously determined by plane position and orientation module 1440. Pixels that are identified as local distance maximums but are within a threshold distance of the plane or behind the plane may be dismissed as candidates for representing a person's hand.

Seed extraction and region growing module 1470 may be used to identify a person's hand/arm from the remaining candidates. A window (e.g., a number of pixels in each direction) around each remaining candidate local distance maximum with the pixel group may be analyzed to determine a seed pixel. Within the window, a depth variation for each pixel may be calculated. A pixel of the pixel group within the window that has a small (e.g., the smallest) depth variation from neighboring pixels within the window may be designated as the seed pixel. This seed pixel may be used for a region growing analysis.

From each seed pixel selected for each remaining local distance maximum pixel, the region growing analysis may be conducted. Pixels bordering or in the neighborhood of the seed pixel may be analyzed on the basis of depth. Intensity for each pixel may be ignored because pixels' intensity values may tend to be noisier than pixels' depth values. If the depth value of a pixel bordering the seed pixel is within a threshold distance of the seed pixel's depth, this pixel may be added to a pixel blob associated with the seed pixel. Pixels that border the added pixel may in turn be analyzed to determine if these pixels should be added to the pixel blob. If a pixel's coordinates are outside the depth threshold established based on the seed pixel, this pixel may not be added to the pixel blob and its neighboring pixels may not be analyzed. Rather than initially only comparing the depth of directly neighboring pixels to the seed pixel, a grid-based neighborhood may be used, such as pixels in a five-by-five grid around the seed pixel and/or each pixel added to the pixel blob.

Each pixel blob created by seed extraction and region growing module 1470 may be analyzed to determine if the pixel blob likely represents a hand (or hand/arm combination). A pixel blob may be determined to represent a person's hand (hand/arm) in a plurality of ways. For example, if the pixel blob represents an elongated object (e.g., longer in one direction than the other by at least a certain ratio) and, possibly, one end of the elongated object is determined to be open (not connected to another object) and one end of the elongated object is determined to be closed (connected to another object), the pixel blob may be determined to represent a person's hand and arm. As another example, if the pixel blob is determined likely to correspond to a previous pixel blob identified as a hand or hand/arm combination based on location, shape, and/or time, the pixel blob may be determined to correspond to a hand. Pixel blobs that are not identified as a hand or hand/arm combination, for example based on being an elongated object or likely representing a previously detected hand or hand/arm combination, may be dismissed as being a candidate for representing a hand. Pixel blobs may also be filtered based on threshold blob sizes. In some embodiments, a model of a hand may be used to determine if a blob corresponds to a hand. Other techniques are also possible.

Coordinate calculation and output module 1490 may determine a set of two dimensional and/or three dimensional coordinates to be output based on the one or more pixel blobs determined to correspond to a person's hand or hand/arm combination by hand detection and location module 1480. Coordinates for a pixel blob determined to contain a person's hand may be determined based on a weighted average of the pixels of the pixel blob. The closer a pixel of the pixel blob is to the image capture device (that is, the smaller the depth value of the pixel), the greater the weight given to pixel. The coordinates based on the weighted average may be output to another component, module, device, or system. For example, these coordinates may be used for determining a gesture being performed by a person's hand. In some embodiments, a bounding box surrounding the blob and/or hand or a portion thereof may be output, instead of or in addition to the coordinates, based on the pixel blob.

Figure 15A:
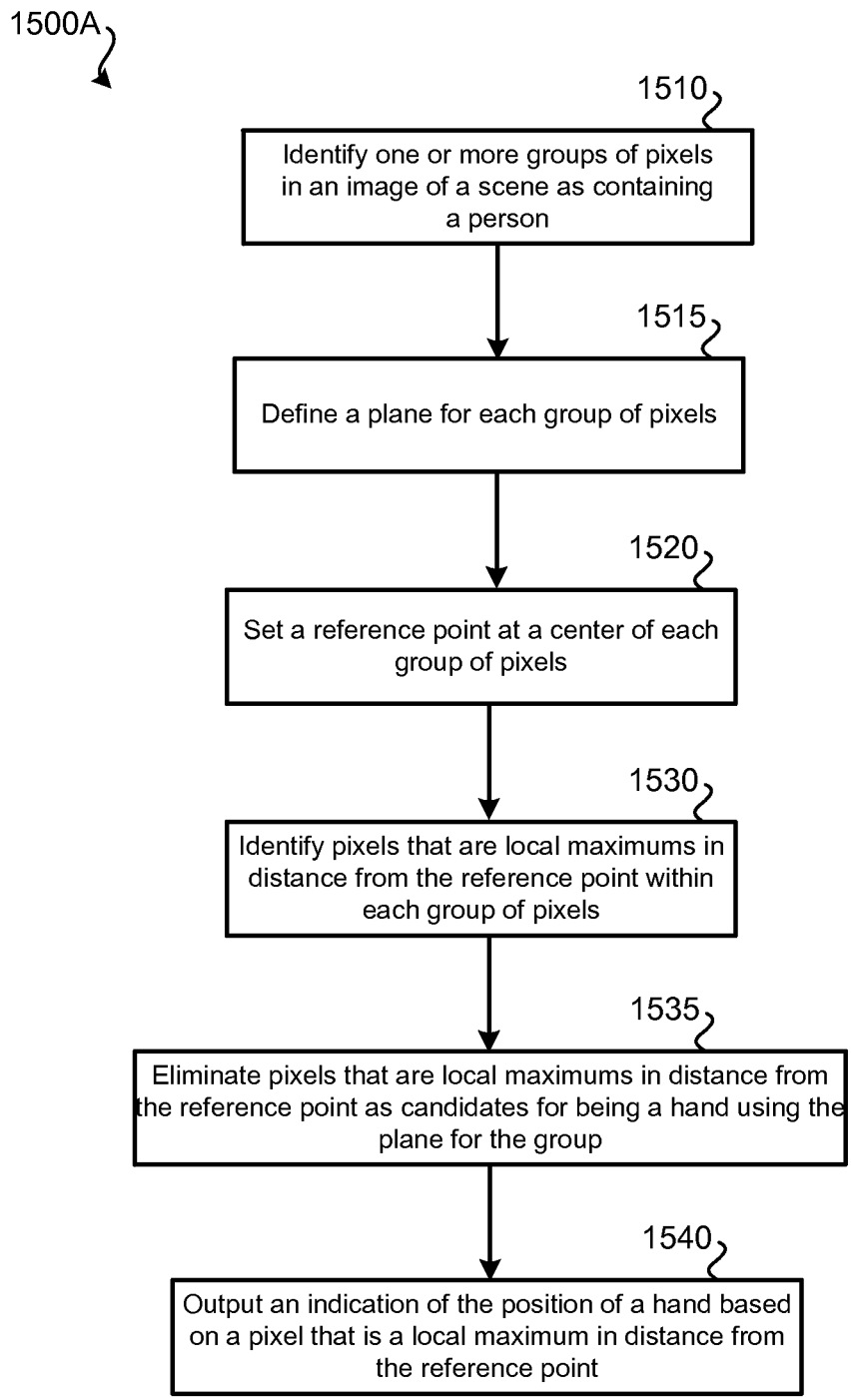
FIG. 15A illustrates an embodiment of a method for determining a position of a hand.

Various methods may be used to perform the analysis described in relation to FIGS. 10A through 13. System 100 of FIG. 1, system 200 of FIG. 2, and/or system 1400 of FIG. 14 may be used to performed various methods. FIG. 15A illustrates an embodiment of a method 1500A for determining a location of a person's hand. Method 1500A may be performed using system 100, system 200, system 1400 or some other system that is configured to capture images of a scene, locate a person's hand, and output coordinates of the person's hand. Method 1500A may be performed using a computerized device, such as computer system 1900 of FIG. 19. Various steps of method 1500A may be implemented using software, hardware, and/or firmware. Means for performing method 1500A may include computerized devices, components of system 100, components of system 200, and/or components of system 1400.

At step 1510, a group of pixels in an image of scene may be identified as a person. The image of the scene used at step 1510 may have had one or more pixels removed. The image of the scene used may be the image output from method 800 of FIG. 8 at step 830 or method 900 of FIG. 9 at step 980. The pixels that were removed may have been identified as background, and thus are unlikely to correspond to a person.

Rather than removing the pixels, the pixels may be classified as background. The pixels analyzed at step 1510 may have been classified as either foreground or may have received an uncertain classification. At step 1510, based on the depth of pixels, pixels may be grouped into one or more pixel groups. Accordingly, pixels that are proximate to each other and have a similar depth may be determined to likely correspond to the same object. These pixels may be grouped into the same pixel group. Each pixel group may be analyzed to determine if the pixel group likely contains a person. This may be accomplished by performing a principal component analysis (PCA). The PCA may be used to determine if a pixel group contains a head and shoulders. A pixel group can contain more than one head and shoulders (e.g., a pixel group may correspond to two or more persons). Step 1510 may be performed by modules 1410-1430 of system 1400 of FIG. 14.

For each group of pixels, a plane may be positioned and oriented to minimize the total amount of fitting error between pixels of the group of pixels and the plane at step 1515. Ideally, this plane may be aligned with the torso, shoulders, and head of the group of pixels likely corresponding to the person. To position the plane while limiting the effect of a possible extended hand and arm (as is present in image 1100), a plane may initially be fit to the entire group of pixels. This plane may be in various orientations in three dimensional space. The plane may be fit to the group of pixels to minimize a total amount of fitting error for pixels of the group. The fitting error for an individual pixel may be a function of the shortest distance from the plane to the three dimensional coordinate of the pixel. As such, the distance may be determined along a line extending perpendicularly from the plane (the distance is zero if the point associated with the pixel falls on the plane). Step 1515 may be performed by module 1440 of system 1400 of FIG. 14.

The position of the plane may then be refined. Based on a factor such as the mean amount of fitting error for all the pixels of the pixel group or a predefined threshold amount, a threshold fitting error value may be calculated. Since the initial location and/or orientation of the plane may be affected by an outstretched hand and arm, the plane may be located in front of the person's torso, head, and shoulders. However, since the person's hand is smaller than the torso, head, and shoulders (the hand is associated with fewer pixels), it can be assumed the plane may be closer to the person's torso, head, and shoulders than the person's hand because the total amount of fitting error is used to fit the plane. Accordingly, pixels with a fitting error greater than a threshold fitting error value may be eliminated from use in determining a next iteration of the position and orientation of the plane. Since a person's hand and arm likely correspond to at least some of the pixels with farther coordinates from the plane (than the person's torso, head or shoulders), the pixels associated with an outstretched hand and/or arm will likely be eliminated from use in calculating a refined position and orientation of the plane. The position and orientation of the plane may then be recalculated and best fit to the coordinates of the pixels that were not eliminated to minimize an amount of fitting error. This new position of the plane may be used as the final position of the plane, or the process may be repeated additional times to further refine the position and orientation of the plane. In some embodiments, only the initial estimate of the plane location and orientation is used.

At step 1520, a reference point, which may be referred to as the center of gravity, may be set at the center of the group of pixels. The reference point may be determined by taking an average of the x-value, y-value, and z-value (depth value) of each pixel in the pixel group. In some embodiments, a weighted average may be used to determine a reference point. For instance, a pixel closer to the image capture device (having a smaller depth value) may be afforded greater weight than pixels with a greater depth value. A reference point other than the average coordinates of the pixel group may be used in some embodiments. Step 1520 may be performed by module 1450 of system 1400 of FIG. 14.

At step 1530, local distance maximum pixels may be determined for the group of pixels. Each local distance maximum may be a pixel of the group of pixels that is a greater distance away from the reference point than the pixel's neighboring pixels (that are also part of the pixel group). As such, local distance maximum pixels may be expected to be located at extremities of the group of pixels. Referring, for example, to FIG. 13, local distance maximums may occur at pixels corresponding to a person's head, shoulders, and fingers. Step 1530 may be performed by module 1460 of system 1400 of FIG. 14.

At step 1535, the plane aligned with the group of pixels from step 1515 may be used to eliminate pixels identified as local distance maximums from the reference point as being candidates for representing a person's hand. If a pixel that was determined to be a local distance maximum from the reference point is within a threshold distance of the plane (on either side of the plane), the pixel may be dismissed as being a candidate for representing a person's hand. Since the plane is expected to be approximately aligned with the person's head, shoulders, and torso, if a person is performing a gesture, the person's hand is typically extended away from the person's body (where the plane is likely located) and thus would be outside the threshold distance to the plane. Thus, a local distance maximum pixel associated with the person's hand may be unlikely to be eliminated as a candidate based on the plane. Step 1535 may be performed by modules 1460-1480 of system 1400 of FIG. 14.

At step 1540, two dimensional and/or three dimensional coordinates may be output that indicates the position of a person's hand based on a local distance maximum pixel outside of the threshold distance from the plane. In some embodiments, if after eliminating candidates using the plane, only a single local distance maximum pixel remains, the coordinates of this remaining local distance maximum pixel may be used for identifying the location of the person's hand. In other embodiments, one or more local distance maximum pixels that have not been eliminated as candidates for being a person's hand may be further analyzed and used to output coordinates. Step 1540 may be performed by module 1490 of system 1400 of FIG. 14. It should be understood that coordinates for multiple hands may be output instead of coordinates for a single hand. For example, coordinates for two hands of a single person or hands of different persons may be output. In some embodiments, if multiple hands are detected, only coordinate for a particular hand may be output. For example, the hand closest to the image capture device may be given priority. In some embodiments, the larger hand is given priority (e.g., a parent's hand movement overrides a child's). In some embodiments, hands in one or more regions of a scene are given priority over any hands present in other regions of scene (e.g., a hand detected of a person sitting on a couch overrides a hand position of a person standing behind the couch).

Figure 15B:
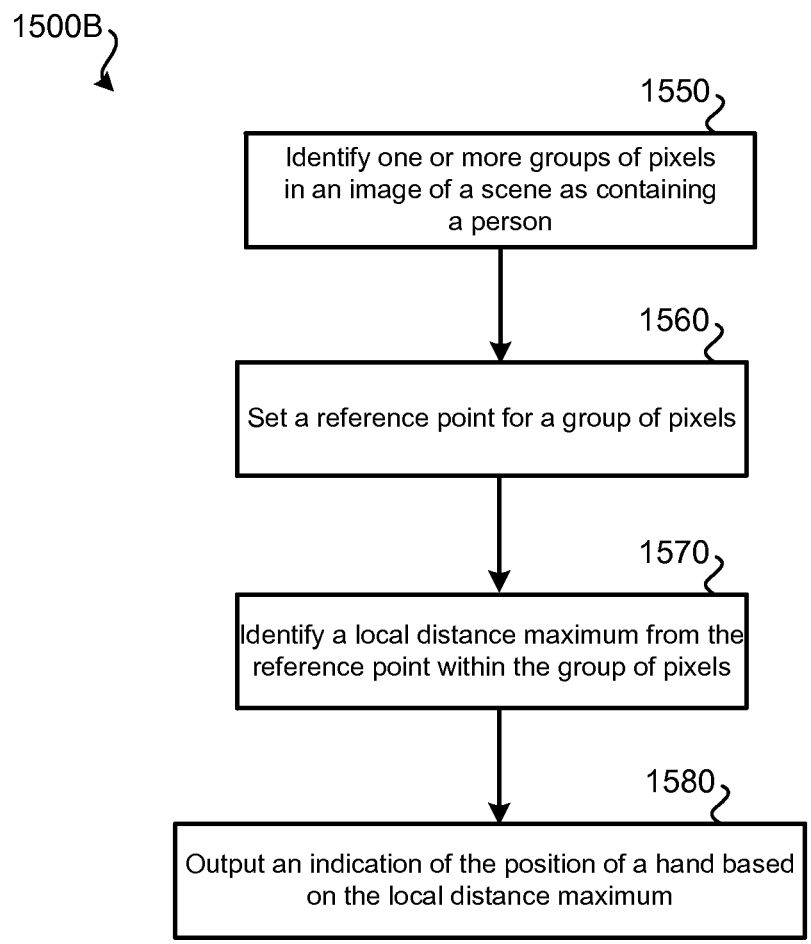
FIG. 15B illustrates another embodiment of a method for determining a position of a hand.

FIG. 15B illustrates an embodiment of a method 1500B for determining a location of a person's hand. Method 1500B may be performed using system 100, system 200, system 1400 or some other system that is configured to capture or receive images of a scene, locate a person's hand, and output coordinates of the person's hand. Method 1500B may be performed using a computerized device, such as computer system 1900 of FIG. 19. Various steps of method 1500B may be implemented using software, hardware, and/or firmware. Means for performing method 1500B may include computerized devices, components of system 100, components of system 200, and/or components of system 1400. It should be understood that method 1500B may also include additional steps of method 1500A and/or method 1600 of FIG. 16 and/or may include steps which are not illustrated.

At step 1550, a group of pixels in an image of a scene may be identified as a person or as representing a person. The image of the scene used at step 1550 may have had one or more pixels removed. The image of the scene received may be the image output from method 800 of FIG. 8 at step 830 or method 900 of FIG. 9 at step 980. The pixels that were removed may have been identified as background, and thus are unlikely to correspond to a person. Rather than removing the pixels, the pixels may be classified as background. The pixels analyzed at step 1550 may have been classified as either foreground or may have received an uncertain classification. At step 1550, based on the depth of pixels, pixels may be grouped into one or more pixel groups. Accordingly, pixels that are proximate to each other and have a similar depth may be determined to likely correspond to the same object. These pixels may be grouped into the same pixel group. Each pixel group may be analyzed to determine if the pixel group likely contains a person. This may be accomplished by performing a principal component analysis (PCA). The PCA may be used to determine if a pixel group contains a head and shoulders. A pixel group can contain more than one head and shoulders (e.g., a pixel group may correspond to two or more persons). Step 1550 may be performed by modules 1410-1430 of system 1400 of FIG. 14.

At step 1560, a reference point may be set for a group of pixels identified as representing the person. In some embodiments, a reference point, which may be referred to as the center of gravity, may be set at the center of the pixel group. The reference point may be determined by taking an average of the x-value, y-value, and z-value (depth value) of each pixel in the pixel group. In some embodiments, a weighted average may be used to determine a reference point. For instance, a pixel closer to the image capture device (having a smaller depth value) may be afforded greater weight than pixels with a greater depth value. A reference point other than the average coordinates of the pixel group may be used in some embodiments. In some embodiments, a reference point, which may be set at the center of gravity, may be set for each group identified at step 1550. Step 1560 may be performed by module 1450 of system 1400 of FIG. 14.

At step 1570, a local distance maximum from the reference point may be identified. For example, local distance maximum pixels may be determined for each group of pixels identified at step 1550. Each local distance maximum may be a pixel of the group of pixels that is a greater distance away from the reference point than the pixel's neighboring pixels (that are also part of the pixel group). As such, local distance maximum pixels may be expected to be located at extremities of the group of pixels. Referring, for example, to FIG. 13, local distance maximums may occur at pixels corresponding to a person's head, shoulders, and fingers. Step 1570 may be performed by module 1460 of system 1400 of FIG. 14.

At step 1580, two dimensional and/or three dimensional coordinates may be output that indicates the position of a person's hand based on the identified local distance maximum. For example, an indication of a position of the hand may be output based on a pixel that is a local maximum in distance from a reference point. In some embodiments, only a single local distance maximum pixel may be present, and the coordinates of this local distance maximum pixel may be used for identifying the location of the person's hand. In other embodiments, one or more local distance maximum pixels that have not been eliminated as candidates for being a person's hand may be further analyzed and/or used to output coordinates. Step 1580 may be performed by module 1490 of system 1400 of FIG. 14. It should be understood that coordinates for multiple hands may be output instead of coordinates for a single hand. For example, coordinates for two hands of a single person or hands of different persons may be output, for example when a plurality of groups of pixels were identified at step 1550. In some embodiments, if multiple hands are detected, only coordinates for a particular hand may be output. For example, the hand closest to the image capture device may be given priority. In some embodiments, the larger hand is given priority (e.g., a parent's hand movement overrides a child's). In some embodiments, hands in one or more regions of a scene are given priority over any hands present in other regions of scene (e.g., a hand detected of a person sitting on a couch overrides a hand position of a person standing behind the couch).

Figure 16:
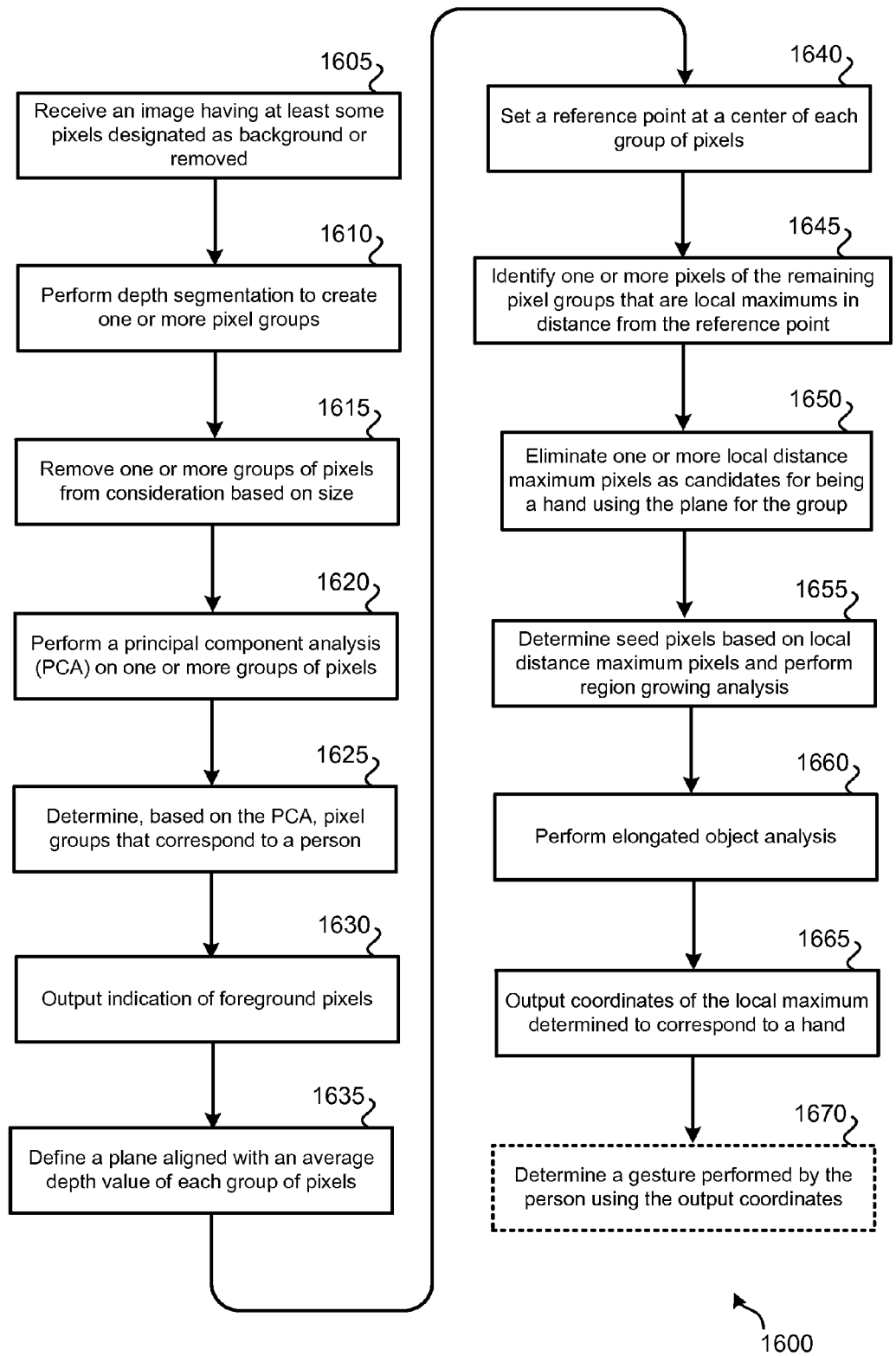
FIG. 16 illustrates another embodiment of a method for determining a position of a hand.

FIG. 16 illustrates an embodiment of a method 1600 for determining a position of a hand. Method 1600 may be performed using system 100, system 200, system 1400 or some other system that is configured to receive images of a scene, locate a person's hand, and output coordinates of the person's hand. Method 1600 may be performed using a computerized device, such as computer system 1900 of FIG. 19. Various steps of method 1600 may be implemented using software, hardware, and/or firmware. Means for performing method 1600 may include computerized devices, components of system 100, components of system 200, and/or components of system 1400. Method 1600 may represent a more detailed embodiment of method 1500A.

At step 1605, an image of a scene may be received. The image of the scene received at step 1605 may have had one or more pixels removed. The image of the scene received at step 1605 may be the image output from method 800 of FIG. 8 at step 830 or method 900 of FIG. 9 at step 980. These pixels that were removed may have been designated as background, and thus are unlikely to represent a person. In some embodiments, rather than removing the pixels, the pixels may be classified as background. The pixels received at step 1605 may have been classified as either foreground or received an uncertain classification. Referring to system 200 of FIG. 2, background/foreground extraction module 250 may have removed some pixels or designated some pixels as background in an image received from image acquisition module 210. If background/foreground extraction module 250 has insufficient information to determine if a pixel is likely part of the foreground or background, depth segmentation module 220 may receive an image with no pixels removed or designated as background. Step 1605 may be performed by module 1410 of system 1400 of FIG. 14.

At step 1610, based on the depth of pixels, pixels may be grouped into one or more pixel groups. Accordingly, pixels that are proximate to each other and have a similar depth may be determined to likely correspond to the same object. These pixels may be grouped into the same pixel group. Referring to FIG. 10A, for example, three pixel groups are present: pixel group 1010A, pixel group 1020, and pixel group 1030. Step 1610 may be performed by module 1420 of system 1400 of FIG. 14.

In some embodiments, pixels that are initially grouped into different pixel groups may be treated as being part of the same pixel group (referred to as a compound pixel group). This may be based on two (or more) pixel groups likely previously being part of a single pixel group. A single pixel group may become two pixel groups if a portion of the object that the pixel groups represent becomes occluded. For example, referring to FIG. 10B, a person's hand, represented by pixel group 1010B-2 may occlude the person's arm that connect the hand to the person's body of pixel group 1010B-1. If the depth segmentation image of FIG. 10A was created based on an image captured prior to the depth segmentation image of FIG. 10B, based on the amount of time elapsed between the images being captured, the shape, and/or the location of pixels groups, both pixel groups 1010B-1 and 1010B-2 may be determined to correspond to pixel group 1010A of FIG. 10A. Accordingly, pixel group 1010B-1 and 1010B-2 may be an example of a compound pixel group.

At step 1615, one or more groups of pixels may be eliminated from being candidates to correspond to a person based on size and/or distance from the image capture device. If a group of pixels is too small, too large, too close, or too far from the image capture device, the group of pixels may be eliminated as a candidate for containing a person. Whether a group of pixels is too small, too large, too close, or too far may be determined based on stored threshold values. Referring to FIG. 10B, pixel groups 1020 and 1030 may be eliminated as candidates for containing a person. Step 1615 may be performed by module 1425 of system 1400 of FIG. 14.

At step 1620, a principal component analysis (PCA) may be performed on the remaining candidate pixel groups to identity one or more sets of a head with shoulders. Previously, a large number (e.g., tens, hundreds, thousands, etc.) of images of people's upper bodies may be captured. Each such sample image may be converted into a binary silhouette, normalized in a fixed direction. These samples may include samples where the upper body (e.g., head and shoulders) of the persons are rotated along the x-axis, y-axis, and/or z-axis. Based on the samples, a PCA is conducted to compute the covariance matrix of all the samples. The model created may consist of the N largest eigen vectors of the covariance matrix. In some embodiments, the 7 largest vectors (also referred to as principal components) may be used for the PCA of pixel groups in an image being analyzed. The principal components may be predetermined and may be stored onto the system performing the analysis. It should be understood that greater or fewer vectors may also be used for the model. The predetermined principal components may be used in conducting a PCA to determine if a pixel group likely corresponds to a person because it appears to have at least one set of a head and shoulders. At step 1625, based on the PCA of each remaining candidate pixel group, one or more pixel groups may be identified as corresponding to a person. Pixel groups without a head and shoulders may be dismissed and not analyzed further. As such, following step 1625, each remaining pixel group is considered to contain a person. Step 1620 may be performed by module 1430 of system 1400 of FIG. 14.

At step 1630, an indication of each pixel determined to correspond to a person may be output. Each pixel that is part of a pixel group that was determined to have a head and shoulders at step 1625 may be output at step 1630. These pixels may be referred to as foreground pixels. The indication of these pixels may include the pixel's coordinates, depth, and/or intensity. Referring to system 200 of FIG. 2, indications of the foreground pixels may be output by depth segmentation module 220 and provided to foreground modeling module 240. Foreground modeling module 240 may use the indications of the foreground pixels to create a foreground model for use by background/foreground extraction module 250 as previously detailed. Step 1630 may be performed by module 1430 of system 1400 of FIG. 14.

At step 1635, for each group of pixels that was determined to correspond to at least one person, a plane may be defined. For each group of pixels, a plane may be positioned and oriented to minimize the fitting error between some or all of the pixels of the group of pixels and the plane. Ideally, this plane may be aligned with the torso, shoulders, and head of the pixels corresponding to the person. To position the plane while limiting the effect of a possible extended hand and arm (as is present in image 1100 of FIG. 11), a plane may initially be fit to the entire group of pixels. This plane may be in various orientations in three dimensional space. The fitting error for an individual pixel may be a function of the shortest distance from the plane to the three dimensional coordinate of the pixel. As such, the shortest distance is along a line extending perpendicularly from the plane (the distance is zero of the point associated with the pixel falls exactly on the plane). Step 1635 may be performed by module 1440 of system 1400 of FIG. 14.

After initially being positioned, the position of the plane may then be refined. Based on a factor such as the mean amount of fitting error for all the pixels of the pixel group a threshold fitting error value may be calculated. A predefined threshold fitting error value may also be used. Since the initial location and/or orientation of the plane may be affected by an outstretched hand and arm (such as if the person is performing a gesture), the plane may be located in front of the person's torso, head, and shoulders. However, since the person's hand is smaller than the torso, head, and shoulders (the hand is associated with fewer pixels), it can be assumed the plane may be closer to the person's torso, head, and shoulders than the person's hand because the total amount of fitting error is used to fit the plane. Accordingly, pixels with a fitting error greater than a determined or predefined threshold fitting error value may be eliminated from use in determining the next iteration of the position and orientation of the plane. Since a person's outstretched hand and arm will likely correspond to at least some of the pixels of the pixel group with the farthest coordinates from the plane, the pixels associated with an outstretched hand and/or arm will likely be eliminated from use in calculating the next or subsequent iterations of the plane's position and orientation. The position and orientation of the plane may be recalculated and best fit to the coordinates of the pixels that were not eliminated to minimize an amount of fitting error. This new position/orientation of the plane may be used as the final position of the plane, or the process may be repeated for additional iterations of positioning and orienting the plane. In some embodiments, only the initial estimate of the plane location and orientation is used.

At step 1640, a reference point, which may be referred to as a center-of-gravity, may be calculated for each remaining group of pixels. The reference point may be determined by taking an average of the x-value, y-value, and z-value (depth value) of each pixel in the pixel group. In some embodiments, a weighted average may be used to determine a reference point. For instance, a pixel closer to the image capture device (having a smaller depth value) may be afforded greater weight than a pixel with a greater depth value. In other embodiments, a reference point may be determined in a different way. Step 1640 may be performed by module 1450 of system 1400 of FIG. 14.

At step 1645, pixels that are local distance maximums may be determined for the pixel groups remaining. Each local distance maximum pixel may be a pixel of the group of pixels that is a greater distance away from the reference point than the pixel's neighboring pixels (that are also part of the pixel group). As such, local distance maximums may be located at extremities of the group of pixels. Referring, for example, to FIG. 13, local distance maximum pixels may correspond to a person's head, shoulders, and fingers. Local distance maximum pixels may be in three-dimensional space. As such, in FIG. 13, the person's hand may be extended in the general direction of the image capture device. Each pixel identified as a local distance maximum may be used as a candidate for a hand of the person. Step 1645 may be performed by module 1460 of system 1400 of FIG. 14.

At step 1650 for each remaining pixel group, the plane aligned with the group of pixels (from step 1635) may be used to eliminate pixels identified as local distance maximums as being candidates for representing a hand of the person. If a pixel that is a local distance maximum is within a predefined threshold distance of the plane, the pixel may be dismissed as being a candidate for representing a person's hand. Since the plane is expected to be approximately aligned with the person's head, shoulders, and torso, if a person is performing a gesture, the person's hand is typically extended away from the person's body (where the plane is likely located) and thus would be outside the threshold distance from the plane. Referring to FIG. 12, plane 1210 is approximately aligned with the person's torso, head, and shoulders, however the person's hand and arm extends beyond the plane. Step 1650 may be performed by module 1460 of system 1400 of FIG. 14.

Following step 1650, one or more local distance maximum pixels within each group of pixels may remain as candidates for representing a person's hand. (If no local distance maximum pixels remain, it may be determined that the person's hand is not outstretched, and the method may end.) To determine whether a local distance maximum pixel is likely to correspond to a person's hand, a seed pixel may be determined based on the local distance maximum pixel and/or a region growing analysis may be conducted at step 1655. Determination of the seed pixel and performing the region growing analysis may be conducted in accordance with method 1700 of FIG. 17. Step 1655 may be performed by module 1470 of system 1400 of FIG. 14.

At step 1660, an elongated object analysis may be conducted. When a person has his or her arm extended, it may be expected that the person's hand and at least some of the person's forearm will be a similar distance from the image capture device. The presence of an elongated object following the region growing analysis of step 1655 may signal the presence of a person's extended hand and forearm. Method 1800 may be performed to determine if a hand is present following the region growing analysis of step 1655. Step 1660 may be performed by module 1480 of system 1400 of FIG. 14. Other techniques besides an elongated object analysis may be performed to determine if an object comprises a hand.

At step 1665, two dimensional and/or three dimensional coordinates may be output. These coordinates may be determined to correspond to the location of a hand in the image received at step 1605. If no hand is determined to be present, no coordinates may be output at step 1665. Conversely, if multiple hands are determined to be present, more than one set of coordinates may be output. For each image received at step 1605, a set of coordinates may be output at step 1665, if a hand is determined to be present. Step 1665 may be performed by module 1490 of system 1400 of FIG. 14.

Such coordinates may be used for determining a gesture being performed by a person. At step 1670, a gesture performed by the person (via the person's hand) may be determined using the coordinates output at step 1665. In addition to gestures, the coordinates of the person's hand may have other uses, such as for manipulating a cursor on a screen.

Figure 17:
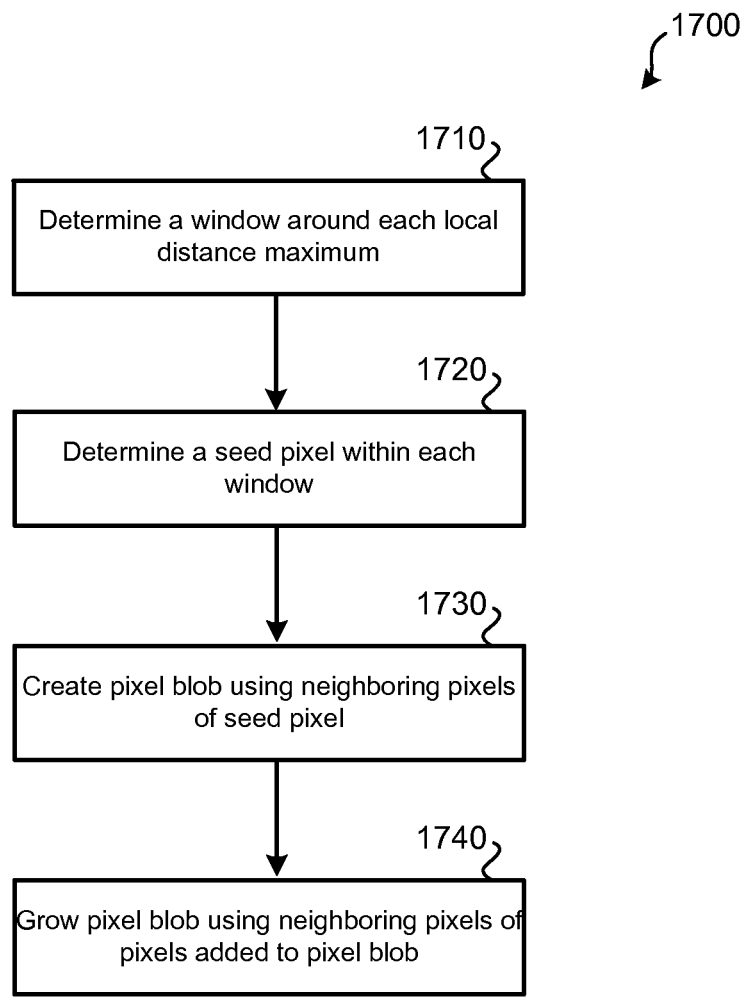
FIG. 17 illustrates an embodiment of a method for determining a seed pixel and creating a pixel blob based on a pixel identified as a local distance maximum.

FIG. 17 illustrates an embodiment of a method 1700 for determining a seed pixel and creating a pixel blob based on a pixel identified as a local distance maximum. Method 1700 may be performed using system 100, system 200, system 1400 or some other system that is configured to receive images of a scene, locate a person's hand, and output coordinates of the person's hand. Method 1700 may be performed using a computerized device, such as computer system 1900 of FIG. 19. Various steps of method 1700 may be implemented using software, hardware, and/or firmware. Means for performing method 1700 may include computerized devices, components of system 100, components of system 200, and/or components of system 1400. Method 1700 may be performed as part of another method, such as at step 1655 of method 1600 of FIG. 16. Each step of method 1700 may be performed by module 1470 of system 1400 of FIG. 14.

At step 1710, for each pixel that is a local distance maximum that has not be otherwise eliminated as a candidate for being a hand of a person, a window of pixels around the local distance maximum pixel may be examined. Since the local distance maximum pixel is likely located at a boundary between an object and space, such as at a fingertip of the person, intensity and/or depth measurements of the local distance maximum pixel may tend to be noisy. A pixel having noisy values may not be effective to serve as a seed pixel for a region growing analysis. As such, another pixel in the vicinity of the local distance maximum pixel may be selected to serve as a seed pixel that is used as the baseline for a region growing analysis. A window of pixels around the local distance maximum pixel may be determined. This window may be each neighboring pixel to the local distance maximum pixel. In some embodiments, a 3×3, 4×4, or 5×5 neighborhood of pixels is used. Other sized pixel neighborhoods may also be used.

From within the window determined at step 1710, a seed pixel which will serve as the baseline pixel for a region growing analysis may be determined at step 1720. For use as a seed pixel, a pixel with little depth (and/or intensity) noise may be desired. From within the window, a pixel that has the least amount of variance in depth value from the average value of its neighboring pixels (or other pixels within the window) may be used as the seed pixel. As such, each pixel within the window may be analyzed to determine which pixel's depth varies the least from its neighboring pixels. Following step 1720, a seed pixel may be selected for each local distance maximum pixel. In some embodiments, the seed pixel may be the local distance maximum pixel.

At step 1730, each neighboring pixel (which may include pixels located diagonally) to the seed pixel may be compared based on each pixel's depth value. If a neighboring pixel has a depth value within a threshold amount of the depth value of the seed pixel, the neighboring pixel may be added to a pixel "blob," that includes the seed pixel. A small depth threshold value may be used, such as an inch. If a neighboring pixel does not have a depth value within a threshold amount of the depth value of the seed pixel, this neighboring pixel is not added to the pixel blob. In some embodiments, rather than using only the directly neighboring pixels of the seed pixel, a larger neighborhood may be used, such as a 5×5 or 7×7 neighborhood. Other sized neighborhoods may also be used.

At step 1740, for each pixel added to the pixel blob at step 1730, each of its neighboring pixels may, in turn, be analyzed in comparison to the depth value of the seed pixel and the neighboring pixel. As such, the global variation (from the seed pixel) and a local variation (for continuity) may be analyzed. If any of these neighboring pixels have a depth value within a threshold amount of the depth value of the seed pixel, the pixel within the threshold depth value may be added to the pixel blob. Pixels that do not have a depth value within a threshold amount of the depth value of the seed pixel, may not be added to the pixel blob. Again, in some embodiments, rather than using only directly neighboring pixels, a larger neighborhood may be used, such as a 5×5 or 7×7 neighborhood. Other sized neighborhoods may also be used. In many embodiments, an odd number is used for defining the neighborhood for symmetry: as such, the seed pixel can be located at the center of the neighborhood.

The pixel blob may continue to be grown according to this method. For each pixel added to the pixel blob determined to be within a threshold depth of the seed pixel, its neighboring pixels may be in turn analyzed. This may continue until no neighboring pixels within the threshold depth value of the seed pixel's depth value are identified. At this point, the pixel blob may be complete.

The pixel blob may grow substantially enough that the pixel blob combines with one or more other pixel blobs that are based on other local distance maximum pixels. If two or more pixel blobs incorporate one or more of the same pixels or adjacent pixels, these pixel blobs may be treated as a single pixel blob. If each pixel blob is grown individually, and a pixel blob grows such that it incorporates a second local distance maximum pixel (other than the first local distance maximum pixel that the pixel blob's seed pixel is based on), a separate pixel blob for the second local distance maximum pixel may not be created. Rather, the pixel blob may be used for both local distance maximum pixels. Following step 1740, each of the one or more created pixel blobs may be analyzed to determine if each pixel blob is likely to correspond to a person's hand or not. Referring to method 1600 of FIG. 16, such an analysis may occur at step 1660.

Figure 18:
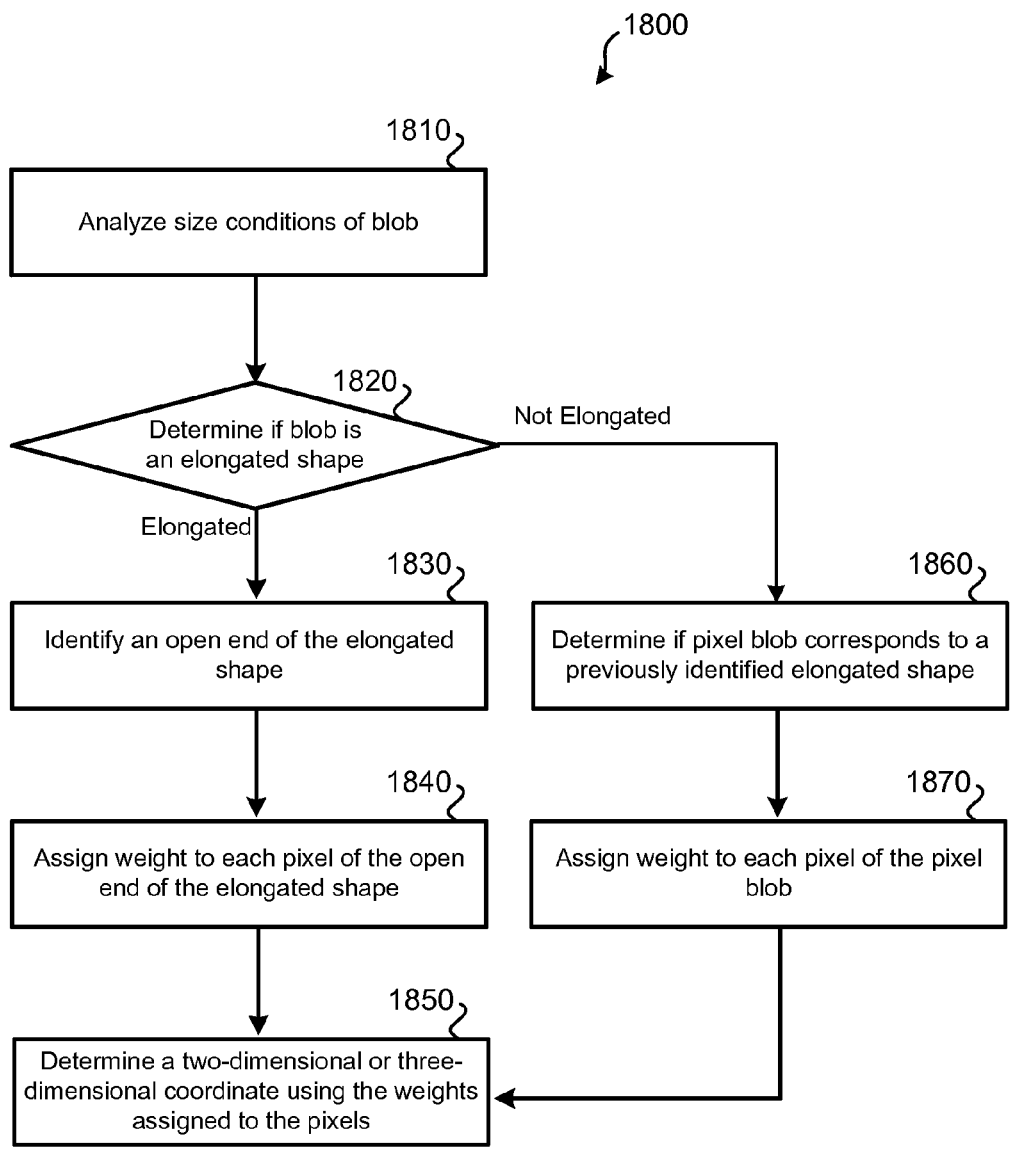
FIG. 18 illustrates an embodiment of a method for analyzing a pixel blob to determine if it likely contains a hand and determine associated coordinates.

FIG. 18 illustrates an embodiment of a method for analyzing a pixel blob to determine if it likely contains a hand and determine associated coordinates. Method 1800 may be performed using system 100, system 200, system 1400 or some other system that is configured to receive images of a scene, locate a person's hand, and output coordinates of the person's hand. Method 1800 may be performed using a computerized device, such as computer system 1900 of FIG. 19. Various steps of method 1800 may be implemented using software, hardware, and/or firmware. Means for performing method 1800 may include computerized devices, components of system 100, components of system 200, and/or components of system 1400. Method 1800 may be performed as part of another method, such as at step 1660 of method 1600 of FIG. 16. Method 1800 may be performed for each pixel blob that is present following step 1655 of method 1600.

At step 1810, the size of a pixel blob may be compared with various thresholds. If a pixel blob is greater than a maximum threshold size or smaller than a minimum threshold size, it may be eliminated as a candidate for containing a hand. Such thresholds may be predefined and/or previously stored.

At step 1820, if the pixel blob qualified under the size conditions of step 1810, a determination may be made as to whether the pixel blob constitutes an elongated shape. An elongated shape may be defined as being at least as twice as long as wide (other definitions of an elongated shape or other types of shapes may also be used). When a person is performing a gesture, typically, the gesture may begin with the person's hand raised such that the person's hand is substantially coplanar with at least some of the person's forearm. Therefore, a pixel blob may appear longer in one direction (from the person's fingertips to part of the person's forearm) than in a perpendicular direction (across the person's hand or forearm). Detection of an elongated shape may be used to differentiate a pixel blob containing a hand from a pixel blob based on some other object or part of the person's body. If an elongated pixel blob is detected, method 1800 may proceed to step 1830.

At step 1830, an "open" end of the pixel blob may be determined. An open end may be defined as an end of the pixel blob not connected to any other object (e.g., part of the person's body). A person's hand would be at the open end of a pixel blob, while a forearm would be part of a closed end, because the forearm is connected with the person's upper arm. To determine which end of the pixel blob is the open end, a Chamfer distance analysis may be conducted. A Chamfer distance analysis may be conducted using pixels along the border of the pixel blob. These border pixels may be analyzed to determine the difference in depth with pixels outside of the pixel blob (e.g., the pixels outside the pixel blob that neighbor the pixel blob). Since a person's hand is at the open end of the elongated pixel blob and is not connected to another object, it can be expected that the distance of pixels along the border of the open end will be a greater distance (as measured using the depth value) from neighboring pixels outside of the pixel blob than pixels of the closed end associated with the person's forearm. Using a predefined threshold distance, a number of neighbors can be found for either end of the elongated pixel blob. The end with the fewest neighbors within a threshold distance may be considered the open end, and thus may be considered to represent a hand.

For pixels of the identified open end of the pixel blob, a weight may be assigned at step 1840. Pixels with the smallest depths may tend to be the more accurately measured pixel values, thus these pixels may be desired to be favored in determining coordinates for the hand. For pixels associated with the open end (e.g., pixels within a threshold distance of edge of the open end), a weighted average of the pixels coordinates (in two or three dimensions) may be calculated at step 1850. The weighted average may weight pixels with smaller depth values greater than pixels farther from the image capture device.

If a pixel blob is not elongated, this does not necessarily mean the pixel blob is not associated with a hand. For instance, a hand outstretched toward the image capture device may occlude the person's forearm, and thus may appear as a non-elongated shape in captured images. Such pixel blobs may still be determined to be a hand if the pixel blob is considered likely to represent the same object as a pixel blob previously identified as an elongated object at step 1860. Such an analysis may be based on time, location, shape, and/or movement of the elongated pixel blob and the non-elongated pixel blob.

If at step 1860 the pixel blob is determined to correspond to a previously identified elongated pixel blob, a weight may be assigned to each pixel of the non-elongated pixel blob at step 1870. A weighted average of the pixels coordinates (in two or three dimensions) may be calculated for the non-elongated pixel blob at step 1850. The weighted average may weight pixels with smaller depth values greater than pixels farther from the image capture device. Returning to step 1860, if the non-elongated pixel blob is not determined to correspond to a previously-identified elongated shape, the pixel blob may be discarded and no coordinates may be calculated for the pixel blob.

Following method 1800, returning to method 1600, the two and/or three dimensional coordinates determined may be output at step 1665 to one or more other modules, components, or devices. Coordinates may only be output when a pixel blob determined to be associated with a hand is present. Such other module, components, or devices may use the coordinates to determine a gesture being performed by the person. The position of a person's hand may also be tracked for other reasons.

A computer system as illustrated in FIG. 19 may be incorporated as part of the previously described computerized devices. For example, computer system 1900 can represent some of the components of the systems discussed in this application. FIG. 19 provides a schematic illustration of one embodiment of a computer system 1900 that can perform the methods provided by various other embodiments, as described herein, and/or can function as components of system 100, system 200, and/or system 1400. It should be noted that FIG. 19 is meant only to provide a generalized illustration of various components, any or all of which may be utilized as appropriate. FIG. 19, therefore, broadly illustrates how individual system elements may be implemented in a relatively separated or relatively more integrated manner.

The computer system 1900 is shown comprising hardware elements that can be electrically coupled via a bus 1905 (or may otherwise be in communication, as appropriate). The hardware elements may include one or more processors 1910, including without limitation one or more general-purpose processors and/or one or more special-purpose processors (such as digital signal processing chips, graphics acceleration processors, and/or the like); one or more input devices 1915, which can include without limitation a mouse, a keyboard, and/or the like; and one or more output devices 1920, which can include without limitation a display device, a printer, and/or the like. Input devices 1915 may comprise the image capture module 110 of system 100 in some embodiments. Processors 1910 may comprise processing module 120 in some embodiments. Storage devices 1925 may include computer-readable storage medium 130.

Similarly, various components of system 200 may be performed by components of computer system 1900. For example, each module of system 200 may be performed by processors 1910 and storage devices 1925 of computer system 1900. Further, various components of system 1400 of FIG. 14 may be performed by components of computer system 1900. For example, each module of system 1400 may be performed by processors 1910 and storage devices 1925 of computer system 1900.

The computer system 1900 may further include (and/or be in communication with) one or more non-transitory storage devices 1925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1900 might also include a communications subsystem 1930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1930 may permit data to be exchanged with a network (such as the network described below, to name one example), other computer systems, and/or any other devices described herein. In many embodiments, the computer system 1900 will further comprise a working memory 1935, which can include a RAM or ROM device, as described above.

The computer system 1900 also can comprise software elements, shown as being currently located within the working memory 1935, including an operating system 1940, device drivers, executable libraries, and/or other code, such as one or more application programs 1945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1925 described above. In some cases, the storage medium might be incorporated within a computer system, such as computer system 1900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1900 and/or might take the form of source and/or installable code, which, upon compilation and/or installation on the computer system 1900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1900) to perform methods in accordance with various embodiments of the invention. According to a set of embodiments, some or all of the procedures of such methods are performed by the computer system 1900 in response to processor 1910 executing one or more sequences of one or more instructions (which might be incorporated into the operating system 1940 and/or other code, such as an application program 1945) contained in the working memory 1935. Such instructions may be read into the working memory 1935 from another computer-readable medium, such as one or more of the non-transitory storage device(s) 1925. Merely by way of example, execution of the sequences of instructions contained in the working memory 1935 might cause the processor(s) 1910 to perform one or more procedures of the methods described herein. Processor(s) 1910 may be used to implement the processing module 120 in some embodiments.

The terms "machine-readable medium" and "computer-readable medium," as used herein, refer to any medium that participates in providing data that causes a machine to operate in a specific fashion. In an embodiment implemented using the computer system 1900, various computer-readable media might be involved in providing instructions/code to processor(s) 1910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1925. Volatile media include, without limitation, dynamic memory, such as the working memory 1935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1900.

The communications subsystem 1930 (and/or components thereof) generally will receive signals, and the bus 1905 then might carry the signals (and/or the data, instructions, etc. carried by the signals) to the working memory 1935, from which the processor(s) 1910 retrieves and executes the instructions. The instructions received by the working memory 1935 may optionally be stored on a non-transitory storage device 1925 either before or after execution by the processor(s) 1910. Non-transitory storage device 1925 may function as a computer-readable storage medium 130 of FIG. 1 in some examples.

Those having skill in the art will appreciate that the terms foreground and background do not limit the models, objects, or positions of objects described herein. Thus, an object in the "background" of a scene may actually be closer to a sensor or camera than an object in a "foreground" of the scene. In certain embodiments described above, background extraction is described as removing objects behind a user, for example a couch or wall. In some embodiments, however, the background extraction may be used to remove an object in front of a user, for example a table, rug, or ottoman. The user may thus still be identified as being in the "foreground" of the scene and foreground models generated to describe a potential location of the user when the user is located behind one or more objects.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for modeling a scene, the method comprising:
receiving, by a computer system, a plurality of images of the scene captured over a period of time, each image comprising a plurality of pixels;
creating, by the computer system, a plurality of background models using the plurality of images, wherein at least one background model is created for each pixel of the plurality of pixels;
creating, by the computer system, a plurality of foreground models using the plurality of images, wherein a foreground model is created for each pixel of at least a first subset of pixels of the plurality of pixels, wherein the plurality of background models and the plurality of foreground models are indicative of the scene over the period of time;
determining, by the computer system, a second subset of the plurality of pixels at least partially based on the plurality of background models and the plurality of foreground models, wherein the second subset of the plurality of pixels contains only some of the plurality of pixels, and the determining the second subset of the plurality of pixels comprises, for a pixel having a foreground model and a background model, determining:
if a probability the pixel is likely to be background is greater than a first threshold value based on the background model for that pixel, and
if a probability the pixel is likely to be foreground is greater than a second threshold value based on the foreground model for that pixel;

determining, by the computer system, that the second subset of the plurality of pixels is representative of at least a portion of a control object; and controlling, by the computer system, an application based upon a detected movement of the control object.

2. The method for modeling the scene of claim 1, further comprising outputting only the second subset of the plurality of pixels.

3. The method for modeling the scene of claim 2, further comprising performing a depth segmentation process on the second subset of the plurality of pixels.

4. The method for modeling the scene of claim 1, wherein each foreground model of the plurality of foreground models is created if a pixel corresponding to the foreground model represents a portion of a person.

5. The method for modeling the scene of claim 1, wherein each pixel of the image comprises a depth value and an intensity value.

6. The method for modeling the scene of claim 5, wherein creating each background model of the plurality of background models comprises:

determining for each pixel at least a first and second statistical measure established over a first portion of the period of time based at least in part on the intensity value and the depth value for the pixel in multiple images of the plurality of images.

7. The method for modeling the scene of claim 6, further comprising:

creating a second background model for a pixel of the plurality of pixels, wherein the second background model comprises at least a third and fourth statistical measure established for the pixel over a second portion of the period of time based at least in part on the intensity value and the depth value for the pixel in multiple images of the plurality of images.

8. The method for modeling the scene of claim 1, further comprising:

receiving an indication for each pixel of the first subset of pixels and a depth value for each pixel of the first subset of pixels, the indication being indicative that the pixel corresponds to a person.

9. The method for modeling the scene of claim 1, further comprising:

receiving a second plurality of images of the scene captured over a second period of time; and updating one or more background models of the plurality of background models and foreground models of the plurality of foreground models based on the second plurality of images.

10. The method for modeling the scene of claim 1, wherein the plurality of background models and the plurality of foreground models are used by an application for determining whether a user is present.

11. The method for modeling the scene of claim 1, wherein the plurality of background models and the plurality of foreground models are used by an application for determining that an input has occurred.

12. The method for modeling the scene of claim 11, further comprising:

determining that an object in a current image is in a foreground of the scene based at least in part on the plurality of background models and the plurality of foreground models, wherein the application determines that the object has provided the input in response to determining that the object is in the foreground.

13. A system for modeling a scene, the system comprising:

an image acquisition module configured to receive a plurality of images of the scene captured over a period of time, each image comprising a plurality of pixels;

a background modeling module configured to create a plurality of background models using the plurality of images, wherein at least one background model is created for each pixel of the plurality of pixels;

a foreground modeling module configured to create a plurality of foreground models using the plurality of images, wherein a foreground model is created for each pixel of at least a first subset of pixels of the plurality of pixels, wherein the plurality of background models and the plurality of foreground models are indicative of the scene over the period of time;

an extraction module configured to:

determine a second subset of the plurality of pixels at least partially based on the plurality of background models and the plurality of foreground models, wherein the second subset of the plurality of pixels contains only some of the plurality of pixels, and, for a pixel having a foreground model and a background model, determine if a probability the pixel is likely to be background is greater than a first threshold value based on the background model for that pixel, and if a probability the pixel is likely to be foreground is greater than a second threshold value based on the foreground model for that pixel; and at least one module configured to determine that the second subset of the plurality of pixels is representative of at least a portion of a control object, and to control an application based upon a detected movement of the control object.

14. The system for modeling the scene of claim 13, further comprising:

an output module configured to create an output of the second subset of the plurality of pixels.

15. The system for modeling the scene of claim 14, wherein the extraction module is further configured to determine, for a pixel having a foreground model and a background model, if the pixel more likely corresponds to the foreground model or the background model.

16. The system for modeling the scene of claim 14, further comprising:

a depth segmentation module configured to perform a depth segmentation process on the second subset of the plurality of pixels.

17. The system for modeling the scene of claim 13, wherein each foreground model of the plurality of foreground models is created if a pixel corresponding to the foreground model represents a portion of a person.

18. The system for modeling the scene of claim 13, wherein each pixel of the image comprises a depth value and an intensity value.

19. The system for modeling the scene of claim 18, wherein the background modeling module comprises:

a submodule configured to determine for each pixel at least a first and second statistical measure established over a first portion of the period of time based at least in part on the intensity value and the depth value for the pixel in multiple images of the plurality of images.

20. The system for modeling the scene of claim 19, wherein the background modeling module is further configured to create a second background model for a pixel of the plurality of pixels, wherein the second background model comprises at least a third and fourth statistical measure established for the pixel over a second portion of the period of time based at least in part on the intensity value and the depth value for the pixel in multiple images of the plurality of images.

21. The system for modeling the scene of claim 13, wherein the extraction module is configured to receive an indication for each pixel of the first subset of pixels and a depth value for each pixel of the first subset of pixels, the indication being indicative that the pixel corresponds to a person.

22. The system for modeling the scene of claim 13, wherein:
the image acquisition module is configured to receive a second plurality of images of the scene captured over a second period of time; and
the background modeling module is configured to update one or more background models of the plurality of background models based on the second plurality of images; and
the foreground modeling module is configured to update one or more foreground models of the plurality of foreground models based on the second plurality of images.

23. The system for modeling the scene of claim 13, wherein the plurality of background models and the plurality of foreground models are used by an application for determining whether a user is present.

24. The system for modeling the scene of claim 13, wherein the plurality of background models and the plurality of foreground models are used by an application for determining that an input has occurred.

25. A non-transitory computer-readable medium having computer-readable instructions stored thereon, the computer-readable instructions being configured to cause a computer to:
receive a plurality of images of the scene captured over a period of time, each image comprising a plurality of pixels;
create a plurality of background models using the plurality of images, wherein at least one background model is created for each pixel of the plurality of pixels;
create a plurality of foreground models using the plurality of images, wherein a foreground model is created for each pixel of at least a first subset of pixels of the plurality of pixels, wherein the plurality of background models and the plurality of foreground models are indicative of the scene over the period of time;
determine a second subset of the plurality of pixels at least partially based on the plurality of background models and the plurality of foreground models wherein the second subset of the plurality of pixels contains only some of the plurality of pixels, and, for a pixel having a foreground model and a background model, determine if a probability the pixel is likely to be background is greater than a first threshold value based on the background model for that pixel, and if a probability the pixel is likely to be foreground is greater than a second threshold value based on the foreground model for that pixel.

26. An apparatus comprising:
means for receiving a plurality of images of the scene captured over a period of time, each image comprising a plurality of pixels;
means for creating a plurality of background models using the plurality of images, wherein at least one background model is created for each pixel of the plurality of pixels;
means for creating a plurality of foreground models using the plurality of images, wherein a foreground model is created for each pixel of at least a first subset of pixels of the plurality of pixels, wherein the plurality of background models and the plurality of foreground models are indicative of the scene over the period of time;
means for determining a second subset of the plurality of pixels at least partially based on the plurality of background models and the plurality of foreground models, wherein the second subset of the plurality of pixels contains only some of the plurality of pixels, and, for a pixel having a foreground model and a background model, if a probability the pixel is likely to be background is greater than a first threshold value based on the background model for that pixel, and if a probability the pixel is likely to be foreground is greater than a second threshold value based on the foreground model for that pixel; and
means for determining that the second subset of the plurality of pixels is representative of at least a portion of a control object, and controlling an application based upon a detected movement of the control object.

27. The apparatus for modeling the scene of claim 26, further comprising:
means for determining a second subset of the plurality of pixels at least partially based on the plurality of background models and the plurality of foreground models, wherein:
the second subset of the plurality of pixels contains only some of the plurality of pixels; and
means for outputting the second subset of the plurality of pixels.

28. The apparatus for modeling the scene of claim 26, wherein each foreground model of the plurality of foreground models is created if a pixel corresponding to the foreground model represents a portion of a person.

29. The apparatus for modeling the scene of claim 26, wherein each pixel of the image comprises a depth value and an intensity value.

* * * * *